(12) United States Patent
Cho et al.

(10) Patent No.: US 11,240,921 B2
(45) Date of Patent: Feb. 1, 2022

(54) DISPLAY DEVICE AND ELECTRONIC DEVICE INCLUDING THE SAME

(71) Applicant: SAMSUNG ELECTRONICS CO., LTD., Suwon-si (KR)

(72) Inventors: Seongju Cho, Suwon-si (KR); Jooyoung Kang, Suwon-si (KR); Jonghwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 16/441,568

(22) Filed: Jun. 14, 2019

(65) Prior Publication Data

US 2019/0387632 A1 Dec. 19, 2019

(30) Foreign Application Priority Data

Jun. 15, 2018 (KR) ........................ 10-2018-0069239

(51) Int. Cl.
*H05K 5/00* (2006.01)
*B32B 7/12* (2006.01)

(52) U.S. Cl.
CPC ............ *H05K 5/0017* (2013.01); *B32B 7/12* (2013.01); *B32B 2457/20* (2013.01); *B32B 2551/00* (2013.01)

(58) Field of Classification Search
CPC .. H05K 5/00; H05K 5/03; H05K 5/06; H05K 5/069; H05K 1/11; H05K 1/14;
(Continued)

(56) References Cited

U.S. PATENT DOCUMENTS 7,088,418 B1    8/2006  Yamashita et al.
9,406,698 B2 *  8/2016  Yamazaki ............ G02F 1/1339
(Continued)

FOREIGN PATENT DOCUMENTS

CN      1284707 A      2/2001
CN    102375269 A      3/2012
(Continued)

OTHER PUBLICATIONS

International Search Report dated Sep. 24, 2019 in counterpart International Patent Application No. PCT/KR2019/007239.
(Continued)

*Primary Examiner* — Tuan T Dinh
(74) *Attorney, Agent, or Firm* — Nixon & Vanderhye P.C.

(57) ABSTRACT

Various embodiments of the disclosure relate to a display device and an electronic device including the same, and for example, to a display device with a filler flow restricting structure for preventing and/or reducing part of a filler from projecting to the outside of the display device in the process of manufacturing the display device and an electronic device including the same. According to an embodiment, a display device comprises a window, a first substrate spaced apart from the window member to define a space, an optical adhesive disposed between the window and the first substrate and configured to attach the window with the first substrate, and a filler flow restricting structure disposed in the space between the window member and the first substrate and formed in a specified area of the first substrate.

14 Claims, 19 Drawing Sheets

(58) Field of Classification Search
CPC .... H05K 1/18; H04L 1/02; H04L 1/18; G06F 1/16; H01L 33/54–56; H01L 33/486; H01L 33/502–507; H04M 1/02; H04M 1/18
USPC ......... 361/679, 749–752, 814; 174/250–261; 349/149–152
See application file for complete search history.

(56) References Cited

U.S. PATENT DOCUMENTS

| | | | |
|---|---|---|---|
| 9,967,375 B1 | 5/2018 | Zhao et al. | |
| 9,992,893 B2 | 6/2018 | Choi et al. | |
| 2009/0322214 A1* | 12/2009 | Lee | H01L 51/524 313/504 |
| 2011/0209890 A1* | 9/2011 | Yamaguchi | H05K 5/069 174/50.5 |
| 2012/0023743 A1 | 2/2012 | Lin et al. | |
| 2013/0063917 A1 | 3/2013 | Choi et al. | |
| 2013/0100124 A1 | 4/2013 | Kim et al. | |
| 2013/0314881 A1 | 11/2013 | Cho et al. | |
| 2014/0063433 A1* | 3/2014 | Benson | G02F 1/133308 349/155 |
| 2014/0267948 A1 | 9/2014 | Bae | |
| 2014/0292184 A1* | 10/2014 | Lee | H01L 27/32 313/504 |
| 2015/0070602 A1 | 3/2015 | Fujita | |
| 2015/0179586 A1 | 6/2015 | Youk et al. | |
| 2015/0245513 A1* | 8/2015 | Moon | G06F 1/16 361/679.01 |
| 2016/0066461 A1 | 3/2016 | Park et al. | |
| 2016/0156755 A1 | 6/2016 | Choi et al. | |
| 2016/0268524 A1 | 9/2016 | Suzuki et al. | |
| 2017/0099742 A1* | 4/2017 | Choi | H05K 5/03 |
| 2019/0254129 A1 | 8/2019 | Cho et al. | |

FOREIGN PATENT DOCUMENTS

| | | |
|---|---|---|
| CN | 103426365 A | 12/2013 |
| CN | 104423103 A | 3/2015 |
| EP | 2 667 246 | 11/2013 |
| KR | 10-2014-0112704 | 9/2014 |
| KR | 10-2016-0063677 | 6/2016 |
| KR | 10-2018-0026191 | 3/2018 |
| WO | 2014/035769 | 3/2014 |

OTHER PUBLICATIONS

Written Opnion dated Sep. 24, 2019 in counterpart International Patent Application No. PCT/KR2019/007239.
Extended Search Report dated Nov. 7, 2019 in counterpart European Patent Application No. 19180349.3.
Chinese Office Action dated Oct. 26, 2021 for CN Application No. 201980038765.5.

* cited by examiner

⇐ : DIRECTION OF AIR EMISSION

DISPLAY DEVICE AND ELECTRONIC DEVICE INCLUDING THE SAME

CROSS-REFERENCE TO RELATED APPLICATION

This application is based on and claims priority under 35 U.S.C. § 119 to Korean Patent Application Serial No. 10-2018-0069239, filed on Jun. 15, 2018, in the Korean Intellectual Property Office, the disclosure of which is incorporated by reference herein in its entirety.

BACKGROUND

Field

The disclosure relates to a display device and an electronic device including the same, and for example, to a display device with a structure for preventing and/or reducing part of a filler from projecting to the outside of the display device in the process of manufacturing the display device and an electronic device including the same.

Description of Related Art

Generally, an electronic device may refer a device performing a particular function according to its equipped program, such as a home appliance, an electronic scheduler, a portable multimedia player, a mobile communication terminal, a tablet PC, a video/sound device, a desktop PC or laptop computer, a navigation device for an automobile, etc. Electronic devices may output stored information as sounds or images. As electronic devices are highly integrated and high-speed, high-volume wireless communication becomes commonplace, mobile communication terminals are recently being equipped with various functions. For example, an electronic device comes with the integrated functionality, including an entertainment function, such as playing video games, a multimedia function, such as replaying music/videos, a communication and security function for mobile banking, and a scheduling or e-wallet function.

Such an electronic device may be exposed to various operational environments when routinely carried and used by the user, as are mobile communication terminals, electronic organizers, or tablet PCs. In various operational environments, diversified types of dust-proof or water-proof structure may be equipped in an electronic device to prevent/reduce influx of a foreign body or water into the electronic device and secure stabilized performance.

A display device of an electronic device may provide various types of user interfaces by visually outputting various pieces of information. The display device of the electronic device includes a light-blocking area (often called a 'bezel area' or 'black matrix (BM) area') which is visible but outputs no screen.

Portable electronic devices with a display device may be required to have a structure to allow them a more compact size and a larger screen. To meet such demand, there may be provided electronic devices with various structures designed to have a minimal light blocking area.

There may be provided an electronic device with an on-cell touch display (OCTA). The OCTA-equipped electronic device may be structured with a minimized light blocking area and include, e.g., a flexible printed circuit board in the portion of a pad to allow the electronic parts to be mounted on multiple layers to thereby secure a mounting space. However, the operation of filling the gap in the pad portion in a method of manufacturing an OCTA-equipped electronic device may bring about the issue that the filler (e.g., a resin) flows down along the side surface of the display device.

To prevent the filler from flowing down on the side surface of the display device, the amount of the filler may be adjusted (e.g., reduced) or the pressure of the nozzle to inject the filler may be reduced. In this case, the filler to fill the internal space of the display device may affect the filling rate, causing deterioration of durability and strength of the display device.

In the process of filling the inside of the display device with the filler, the air may remain inside the display device and so-called 'air trap' may occur. This may also result in a lowering of the durability and strength of the display device, along with influx of a foreign body or moisture from the outside. For example, if moisture comes into the inside of the display device, the polarizing films in the display device may be discolored (e.g., yellowing), which may be the cause of defects.

The above information is presented as background information only to assist with an understanding of the disclosure. No determination has been made, and no assertion is made, as to whether any of the above might be applicable as prior art with regard to the disclosure.

SUMMARY

According to various example embodiments of the disclosure, there may be a display device with a structure (hereinafter 'a filler flow restricting structure') to prevent and/or reduce a filler from flowing down during the course of filling the internal space of the display device and an electronic device including the display device.

According to various example embodiments, a method of manufacturing a display device to prevent and/or reduce the air from being left inside a display device and thus prevent and/or reduce the flow-down of filler by forming a filler flow restricting structure and filling full the internal space of the display device may be provided.

According to an example embodiment, a display device comprises a window, a first substrate spaced apart from the window and defining a space, an optical adhesive disposed between the window and the first substrate and attaching the window with the first substrate, and a filler flow restricting structure disposed in the space between the window and the first substrate and disposed in a specified area of the first substrate.

According to an example embodiment, an electronic device including a display comprises a housing, a window mounted on a front surface of the housing, a first substrate spaced apart from the window, an optical adhesive configured to attach the window with the first substrate, a light-polarizer configured to transmit a designated wavelength of light, a second substrate stacked on at least a portion of the first substrate, a filler flow restricting structure disposed in a space between the window member and the first substrate and disposed in a corner of both end edges of the first substrate when viewed from above an upper surface of the first substrate, and a filler at least partially contacting the filler flow restricting structure and configured to seal the space, wherein the optical adhesive, the light-polarizer, and the second substrate form a stack structure, and wherein the stack structure is disposed between the window and the first substrate to define the space between the window member and the first substrate.

According to an example embodiment, a method of manufacturing a display device comprises seating a display panel, applying an optical adhesive to the display panel, attaching a window to the display panel having the optical adhesive applied thereto, curing the optical adhesive, providing a filler flow restricting structure in a space between the display panel and the window, curing the filler flow restricting structure, filling the space between the display panel and the window with a filler, and curing the filler.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS to the above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1A:
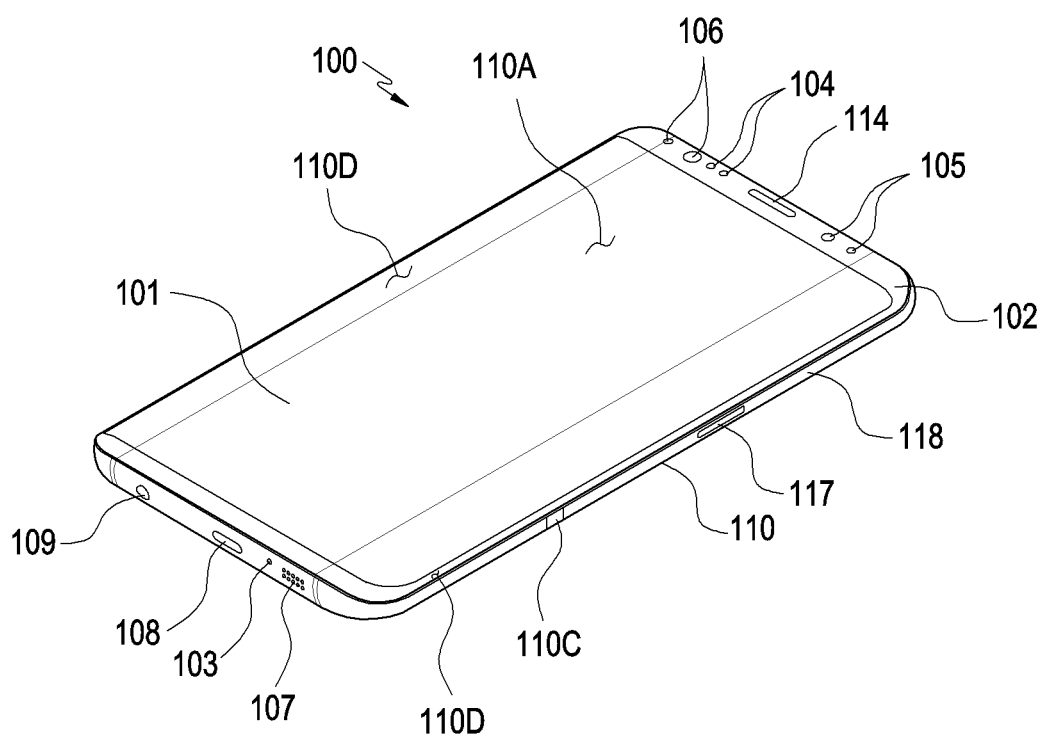
FIG. 1A is a front perspective view illustrating an example mobile electronic device according to an embodiment.

Various changes may be made to the disclosure, and the disclosure may describe various example embodiments. Some example embodiments of the disclosure are illustrated and described in connection with the drawings. However, it should be appreciated that the disclosure is not limited to the illustrated embodiments and all changes and/or equivalents or replacements thereto also fall within the scope of the disclosure.

Ordinal numbers such as 'first' and 'second' may be used to denote various components, but the components are not limited by the terms. The terms are used simply to distinguish one component from another. For example, a first component may be denoted a second component, and vice versa without departing from the scope of the disclosure. The term "and/or" may denote a combination(s) of a plurality of related items as listed or any of the items.

The terms "front," "rear surface," "upper surface," and "lower surface" are relative terms that may be varied depending on directions in which the figures are viewed, and may be replaced with ordinal numbers such as "first" and "second."

The terms as used herein are provided merely to describe various example embodiments thereof, but not to limit the disclosure. It is to be understood that the singular forms "a," "an," and "the" include plural references unless the context clearly dictates otherwise. It will be further understood that the terms "comprise" and/or "have," when used in this disclosure may specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to, for example, and without limitation, as a terminal, a portable terminal, a mobile terminal, a communication terminal, a portable communication terminal, a portable mobile terminal, a display apparatus, or the like.

For example, the electronic device may, for example, and without limitation, be a smartphone, a mobile phone, a navigation device, a game device, a TV, a head unit for vehicles, a laptop computer, a tablet computer, a personal media player (PMP), a personal digital assistant (PDA), or the like. The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, may perform tasks by interworking with such an external electronic device, etc. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, a small area network (SAN), or the like.

Hereinafter, various example embodiments of the disclosure are described with reference to the accompanying drawings.

Figure 1B:
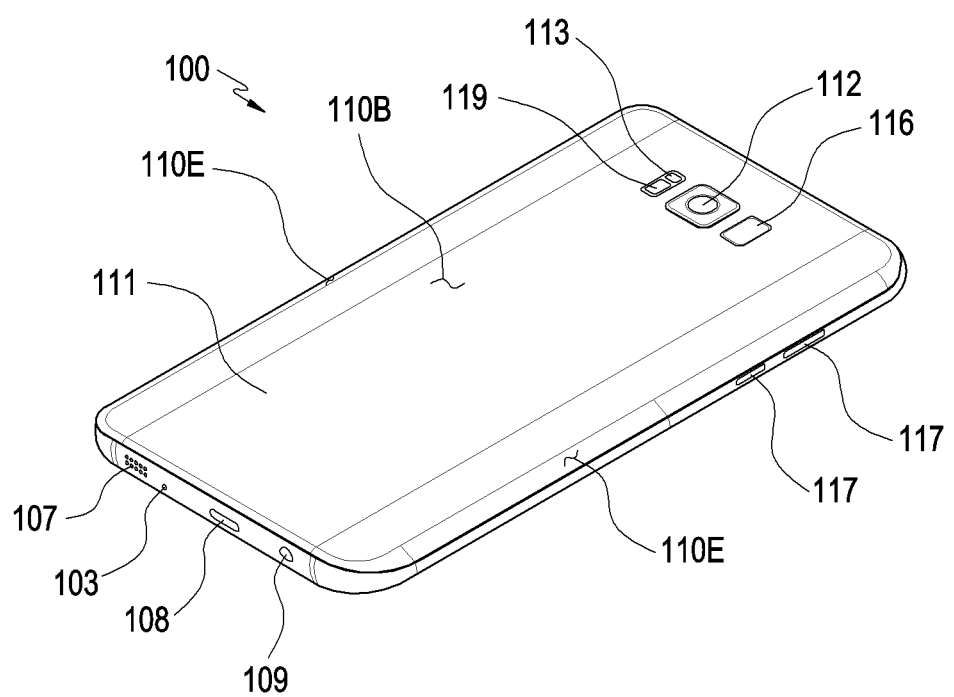
FIG. 1B is a rear perspective view illustrating an example electronic device as shown in FIG. 1A.

FIG. 1A is a front perspective view illustrating a mobile electronic device 100 according to an embodiment. FIG. 1B is a rear perspective view illustrating an electronic device 100 as shown in FIG. 1A.

Referring to FIGS. 1A and 1B, according to an embodiment, an electronic device 100 may include a housing 110 with a first (or front) surface 110A, a second (or rear) surface 110B, and a side surface 110C surrounding a space between the first surface 110A and the second surface 110B. According to another embodiment (not shown), the housing may denote a filler flow restricting structure forming part of the first surface 110A, the second surface 110B, and the side surface 110C of FIG. 1. According to an embodiment, at least part of the first surface 110A may have a substantially transparent front plate 102 (e.g., a glass plate or polymer plate including various coat layers). The second surface 110B may be formed of a substantially opaque rear plate 111. The rear plate 111 may be formed, for example, and without limitation, laminated or colored glass, ceramic, polymer, metal (e.g., aluminum, stainless steel (STS), or magnesium), or the like, or a combination of at least two thereof. The side surface 110C may be formed by a side bezel structure (or a "side member") 118 that couples to the front plate 102 and the rear plate 111 and includes a metal and/or polymer. According to an embodiment, the rear plate 111 and the side bezel plate 118 may be integrally formed together and include the same material (e.g., a metal, such as aluminum).

In the illustrated example embodiment, the front plate 102 may include two first regions 110D, which seamlessly and bendingly extend from the first surface 110A to the rear plate 111, on both the long edges of the front plate 102. In the illustrated example embodiment (refer to FIG. 2), the rear plate 111 may include second regions 110E, which seamlessly and bendingly extend from the second surface 110B to the front plate 102, on both the long edges. According to an embodiment, the front plate 102 (or the rear plate 111) may include only one of the first regions 110D (or the second regions 110E).

Alternatively, the first regions 110D or the second regions 110E may partially be excluded. According to an embodiment, at a side view of the electronic device 100, the side bezel structure 118 may have a first thickness (or width) for sides that do not have the first regions 110D or the second regions 110E and a second thickness, which is smaller than the first thickness, for sides that have the first regions 110D or the second regions 110E.

According to an embodiment, the electronic device 100 may include, for example, and without limitation, at least one or more of a display 101, audio modules 103, 107, and 114, sensor modules 104, 116, and 119, camera modules 105, 112, and 113, key input devices 117, a light emitting device 106, connector holes 108 and 109, or the like. According to an embodiment, the electronic device 100 may exclude at least one (e.g., the key input device 117 or the light emitting device 106) of the components or may add other components.

The display 101 may be exposed through the top of, e.g., the front plate 102. According to an embodiment, at least a portion of the display 101 may be exposed through the front plate 102 forming the first surface 110A and the first regions 110D of the side surface 110C. According to an embodiment, the edge of the display 101 may be formed to be substantially the same in shape as an adjacent outer edge of the front plate 102. According to an embodiment (not shown), the interval between the outer edge of the display 101 and the outer edge of the front plate 102 may remain substantially even to give a larger area of exposure the display 101.

According to an embodiment (not shown), the screen display region of the display 101 may have a recess or opening in a portion thereof, and at least one or more of the audio module 114, sensor module 104, camera module 105, and light emitting device 106 may be aligned with the recess or opening. According to an embodiment (not shown), at least one or more of the audio module 114, sensor module 104, camera module 105, fingerprint sensor 116, and light emitting device 106 may be included on the rear surface of the screen display region of the display 101. According to an embodiment (not shown), the display 101 may be disposed to be coupled with or adjacent to a touch detecting circuit, a pressure sensor capable of measuring the strength (pressure) of touches, and/or a digitizer for detecting a magnetic field-type stylus pen. According to an embodiment, at least part of the sensor modules 104 and 119 and/or at least part of the key input device 117 may be disposed in the first regions 110D and/or the second regions 110E.

The audio modules 103, 107, and 114 may include a microphone hole 103 and speaker holes 107 and 114. The microphone hole 103 may have a microphone inside to obtain external sounds. According to an embodiment, there may be a plurality of microphones to be able to detect the direction of a sound. The speaker holes 107 and 114 may include an external speaker hole 107 and a phone receiver hole 114. According to an embodiment, the speaker holes 107 and 114 and the microphone hole 103 may be implemented as a single hole, or speakers may be rested without the speaker holes 107 and 114 (e.g., piezo speakers).

The sensor modules 104, 116, and 119 may generate an electrical signal or data value corresponding to an internal operating state or external environmental state of the electronic device 100. The sensor modules 104, 116, and 119 may include a first sensor module 104 (e.g., a proximity sensor) and/or a second sensor module (not shown) (e.g., a fingerprint sensor) disposed on the first surface 110A of the housing 110 and/or a third sensor module 119 (e.g., a heart-rate monitor (HRM) sensor) and/or a fourth sensor module 116 (e.g., a fingerprint sensor) disposed on the second surface 110B of the housing 110. The fingerprint sensor may be disposed on the second surface 110A as well as on the first surface 110B (e.g., the display 101) of the housing 110. The electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 and/or a flash 113 disposed on the second surface 110B. The camera modules 105 and 112 may include one or more lenses, an image sensor, and/or an image signal processor. The flash 113 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 100.

The key input device 117 may be disposed on the side surface 110C of the housing 110. According to an embodiment, the electronic device 100 may exclude all or some of the above-mentioned key input devices 117 and the excluded key input devices 117 may be implemented in other forms, e.g., as soft keys, on the display 101. According to an embodiment, the key input device may include the sensor module 116 disposed on the second surface 110B of the housing 110.

The light emitting device 106 may be disposed on, e.g., the first surface 110A of the housing 110. The light emitting device 106 may provide, e.g., information about the state of the electronic device 100 in the form of light. According to an embodiment, the light emitting device 106 may provide a light source that interacts with, e.g., the camera module 105. The light emitting device 106 may include, e.g., a light emitting device (LED), an infrared (IR) LED, or a xenon lamp.

The connector holes 108 and 109 may include a first connector hole 108 for receiving a connector (e.g., a universal serial bus (USB) connector) for transmitting or receiving power and/or data to/from an external electronic device and/or a second connector hole 109 (e.g., an earphone jack) for receiving a connector for transmitting or receiving audio signals to/from the external electronic device.

Figure 2:
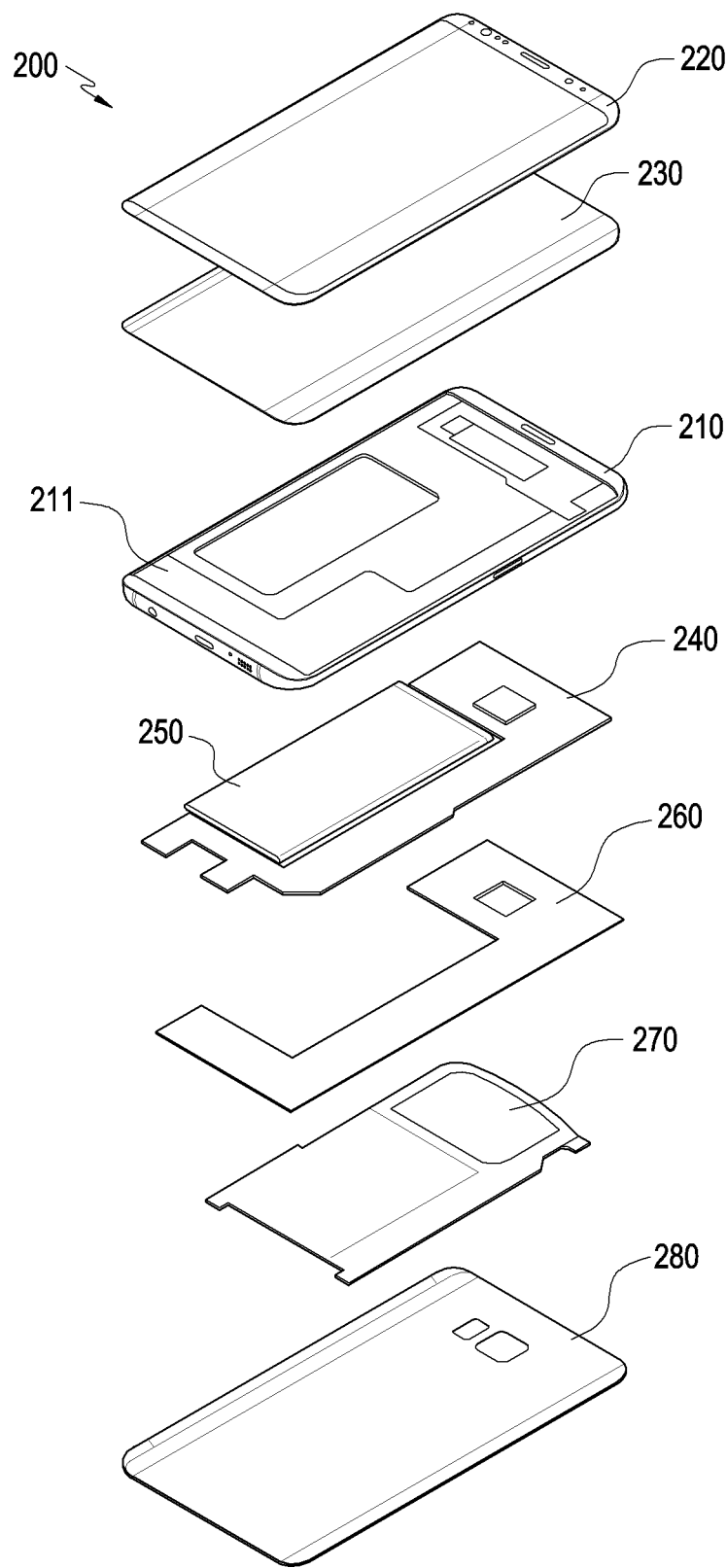
FIG. 2 is an exploded perspective view illustrating an example electronic device as shown in FIG. 1A.

FIG. 2 is an exploded perspective view illustrating an example electronic device as shown in FIG. 1A.

Referring to FIG. 2, an electronic device 200 may include a side bezel structure 210, a first supporting member 211 (e.g., a bracket), a front plate 220, a display 230, a printed circuit board (PCB) 240, a battery 250, a second supporting member 260 (e.g., a rear case), an antenna 270, and a rear plate 280. According to an embodiment, the electronic device 200 may exclude at least one (e.g., the first supporting member 211 or the second supporting member 260) of the components or may add other components. At least one of the components of the electronic device 200 may be the same or similar to at least one of the components of the electronic device 200 of FIG. 1 or 2 and no duplicate description is made below.

The first supporting member 211 may be a support disposed inside the electronic device 200 to be connected with the side bezel structure 210 or integrated with the side bezel structure 210. The first supporting member 211 may be formed of, e.g., a metal and/or non-metallic material (e.g., polymer). The display 230 may be joined onto one surface of the first supporting member 211, and the printed circuit board 240 may be joined onto the opposite surface of the first supporting member 311. A processor, memory, and/or interface may be mounted on the printed circuit board 240. The processor may include one or more of, e.g., a central processing unit, an application processor, a graphic processing device, an image signal processing, a sensor hub processor, or a communication processor.

The memory may include, e.g., a volatile or non-volatile memory.

The interface may include, for example, and without limitation, a high definition multimedia interface (HDMI), a universal serial bus (USB) interface, a secure digital (SD) card interface, and/or an audio interface, or the like. The interface may electrically or physically connect, e.g., the electronic device 200 with an external electronic device and may include a USB connector, an SD card/multi-media card (MMC) connector, or an audio connector.

The battery 250 may be a device for supplying power to at least one component of the electronic device 200. The battery 250 may include, for example, and without limitation, a primary cell which is not rechargeable, a secondary cell which is rechargeable, a fuel cell, or the like. At least a portion of the battery 250 may be disposed on substantially the same plane as the printed circuit board 240. The battery 250 may be integrally or detachably disposed inside the electronic device 200.

The antenna 270 may be disposed between the rear plate 280 and the battery 250. The antenna 270 may include, for example, and without limitation, a near-field communication (NFC) antenna, a wireless charging antenna, and/or a magnetic secure transmission (MST) antenna, or the like. The antenna 270 may perform short-range communication with, e.g., an external device or may wirelessly transmit or receive power necessary for charging. According to an embodiment, an antenna structure may be formed by a portion or combination of the side bezel structure 210 and/or the first supporting member 211.

Figure 3:
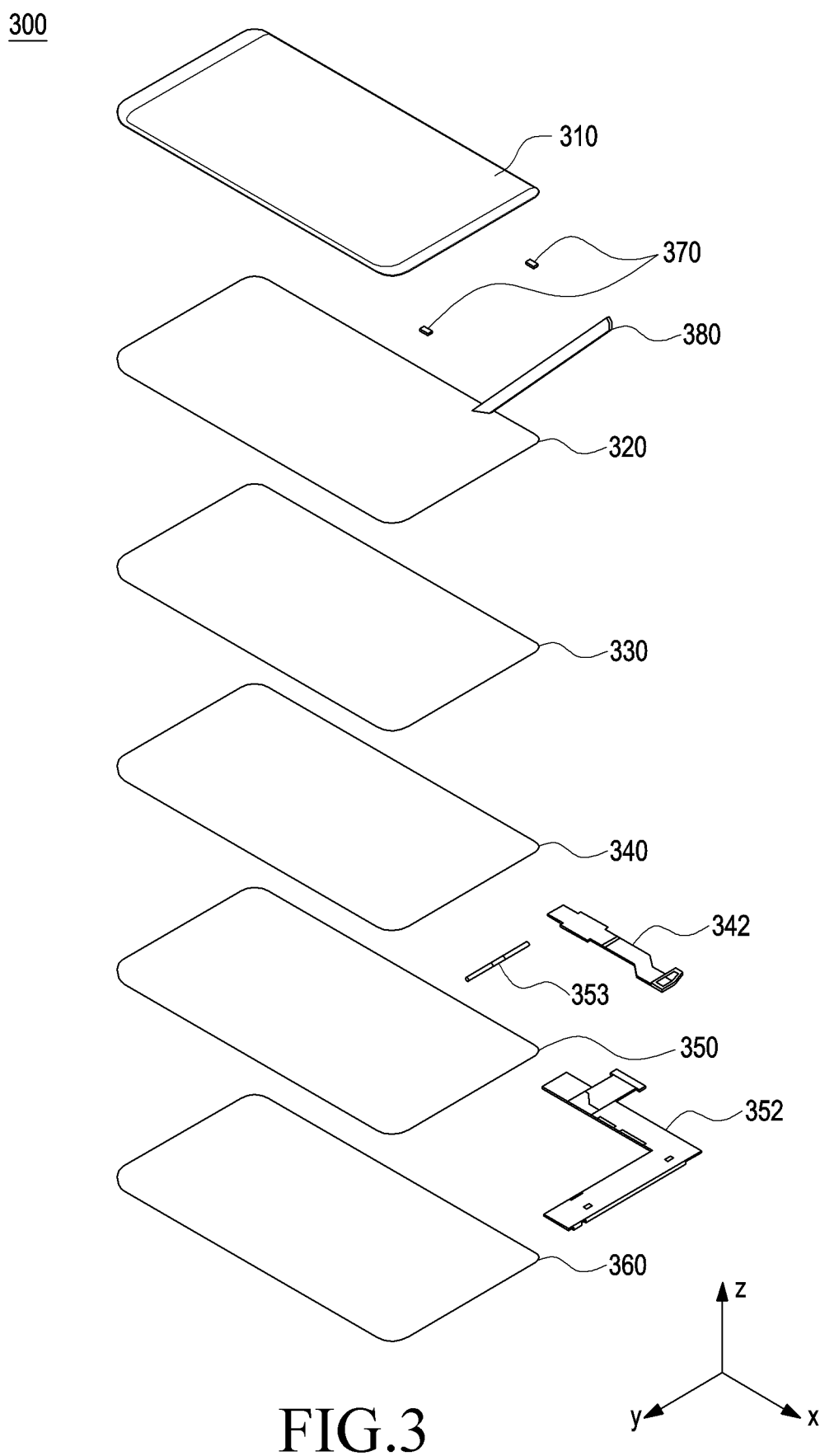
FIG. 3 is an exploded perspective view illustrating an example display device according to an embodiment.

FIG. 3 is an exploded perspective view illustrating an example display device 300 according to an embodiment.

Referring to FIG. 3, an electronic device (e.g., 100 of FIG. 1A) may include a housing (e.g., 110 of FIG. 1A) and a display device 300 mounted in the housing. Although not shown, the housing may receive at least one circuit board or battery and the display device 300 may be mounted on a front surface (e.g., 110A of FIG. 1A) of the housing, thereby forming the outer appearance of the electronic device. According to an embodiment, the display device 300 may be attached to the housing via at least one water-proof member (e.g., a double-sided tape). Thus, dust-proof and water-proof functionality between the housing and the display device 300 may be provided.

According to an embodiment, the display device 300 may include a window member (e.g., a window) 310 and display panels (e.g., indicated by reference numbers 340 and 350) integrated with the window member 310. The window member 310 may be disposed on the front surface (e.g., 110A of FIG. 1A) of the housing (e.g., 110 of FIG. 1A) to, together with the housing, substantially form the outer appearance of the electronic device (e.g., 100 of FIG. 1A). The window member 310 may be formed of a transparent substance, such as, for example, and without limitation, glass, transparent synthetic resin, or the like, to protect the display panels from the external environment while transmitting screens output from the display panels. For example, the window member 310 may be mounted in the housing, with the display panels attached onto an inner surface of the window member 310. The display panels may be received in a mounting space formed by the housing and the window member 310. According to an embodiment, the window member 310 may include various printed layers and/or light blocking layers which are described in greater detail below.

In the following description, the arrangement between the components of the display device 300 may be described based on the directions shown in FIG. 3. The components of the display device 300 may be stacked along the z axis of FIG. 3. The lengthwise direction of the display device 300 may be parallel with the x axis of FIG. 3, and the widthwise direction of the display device 300 may be parallel with the y axis of FIG. 3.

According to an embodiment, the display panels (e.g., indicated reference numbers 340 and 350) may include a first substrate 350 and a second substrate 340. The first substrate 350 and the second substrate 340 may be coupled together while facing each other with a light emitting layer interposed therebetween. According to an embodiment, the first substrate 350 may be a component prepared to output screens. According to an embodiment, a light emitting layer may be deposited on the first substrate 350 which may include thin film transistors (TFTs) to apply electric signals to the light emitting layer. According to an embodiment, a conductive layer may be formed on the second substrate 340 to provide the functionality of a touchscreen. The first substrate 350 may be stacked while facing the second substrate 340. Thus, the light emitting layer may be sealed between the first substrate 350 and the second substrate 340. According to an embodiment, the first substrate 350 may be formed of low temperature polysilicon (LTPS), and the second substrate 340 may be formed of encapsulation glass (ENCAP) to protect the LTPS light emitting layer from moisture and oxygen.

According to an embodiment, an optical adhesive member (e.g., optical adhesive) 320 may be disposed between the display panels and the window member 310. The optical adhesive member 320 may be prepared to attach the first substrate 350 to the window member 310 and be attached while taking up most of the area of the first substrate 350. According to an embodiment, the optical adhesive member 320 may be an adhesive material (e.g., an ink or resin) which, after being cured, exhibits a light transmittance close to or at 100%. According to an embodiment, the optical adhesive member 320 may have a predetermined degree of viscosity even after cured. For example, the optical adhesive member 320 may attach the display panel to the window member 310 while allowing the display panels to be easily separated from the window member 310 without damaging the first substrate 350 or second substrate 340. The optical adhesive member 320 may be formed, for example, and without limitation, of optical clear resin (OCR), super view resin (SVR), or the like.

According to an embodiment, the display device 300 may further include a light-polarizing member (e.g., light polarizer) 330 that may abut at least a portion of the optical adhesive member 320. According to an embodiment, the light-polarizing member 330 may be disposed between the optical adhesive member 320 and the display panel (e.g., indicated by reference numbers 340 and 350). The light-polarizing member 330 may reflect light which comes from the outside. The light-polarizing member 330 may be a member that transmits a designated wavelength of light, which passes through the light-polarizing member 330, in some directions while blocking the light in other directions. According to an embodiment, the light-polarizing member 330 may be provided in the form of a film. The light-polarizing member 330 may be sized to have substantially the same area as the optical adhesive member 320 and may face the display panel (e.g., indicated by reference number 340).

According to an embodiment, the display device 300 may further include a cover member (e.g., cover) 360 under the display panels (e.g., indicated by reference number 340 and 350). The cover member 360 may include, for example, and without limitation, a conductive layer (e.g., a copper (Cu) sheet) and/or an impact absorbing member (e.g., sponge), or the like. The cover member 360 may protect the bottom surface of the display panels from external physical interface or impacts while preventing heating, static electricity, or flickers which may occur on the display panels. The cover member 360 may electromagnetically shield off other surrounding electronic components of the display panels too.

According to an embodiment, the display device 300 may include at least one electronic component 353 and a first circuit board 352 electrically connected with the first substrate 350. The display device 300 may include a second circuit board 342 electrically connected with the second substrate 340. According to an embodiment, at least one of the first circuit board 352 and the second circuit board 342 may be a flexible printed circuit board (FPCB). For example, the first circuit board 352 may be formed of a flexible printed circuit board and may be bent between the top surface (e.g., 351 of FIG. 5 described below) of the first substrate 350 and the bottom surface normal state of the first substrate 350. This allows various electronic components to be distributed in the multi-layered structure, increasing the utility of the internal space of the electronic device (e.g., 100 of FIG. 1A). The above-described first substrate 350 may substantially receive an electric signal through the first circuit board 352 to activate the light emitting layer, thereby displaying a realized screen.

According to an embodiment, the electronic component 353 may, for example, and without limitation, be a display driver integrated circuit (DDI) which adjusts a myriad of pixels of the display device to implement various colors. According to an embodiment, the first circuit board 352 may, for example, and without limitation, be a relaying connector which transfers command signals from the processor (e.g., a processor or application) of the electronic device to the DDI to drive the display panels. According to an embodiment, the second circuit board 342 may, for example, and without limitation, be a relaying connector which transfers touch signals from a touch sensor deposited on the second substrate 340 to a touch integrated circuit (IC) of the electronic device.

According to an embodiment, the display device 300 including the above-described components 310, 320, 330, 340, and 350 may include at least one filler flow restricting structure 370 (which may, for example, and without limitation, be referred to as a filler flow control structure, filler barrier structure, or the like) and a filler (which may, for example, and without limitation, be referred to as a sealing member, seal, sealer, seal material, or the like) 380 disposed to contact the filler flow restricting structure 370.

According to the embodiment illustrated in FIG. 3, although the filler flow restricting structure 370 and the filler 380 are provided at a lower end (e.g., an end portion of the display device 300 along the x-axis direction) of the display device 300, embodiments of the disclosure are not limited thereto. For example, the filler flow restricting structure 370 and the filler 380 may be provided at an upper end of the display device 300 or at each of the upper end and the lower end of the display device 300. Further, the filler flow restricting structure 370 and the filler 380 may be provided anywhere in the internal space (or internal steps) of the display device 300.

According to an embodiment, a pair of filler flow restricting structures 370 may be provided. For example, and without limitation, one, three, or a larger odd number of filler flow restricting structures 370 may be provided. According to an embodiment, as described in greater detail below, the filler flow restricting structure 370 may be provided anywhere in the display device 300 and the electronic device (e.g., 100 of FIG. 1A) as long as a path may be formed between the filler flow restricting structure 370 and the stack structure (e.g., the optical adhesive member and polarizing member).

Now described in greater detail below with reference to FIGS. 4 to 11 are examples of a filler flow restricting structure 370 and a filler 380 in a display device 300 according to an example embodiment.

With reference to FIGS. 4, 5, 6, 7A, 7B, 8A and 8B is an example embodiment in which the filler flow restricting structure 370 and the filler 380 are not provided in the display device 300.

Figure 4:
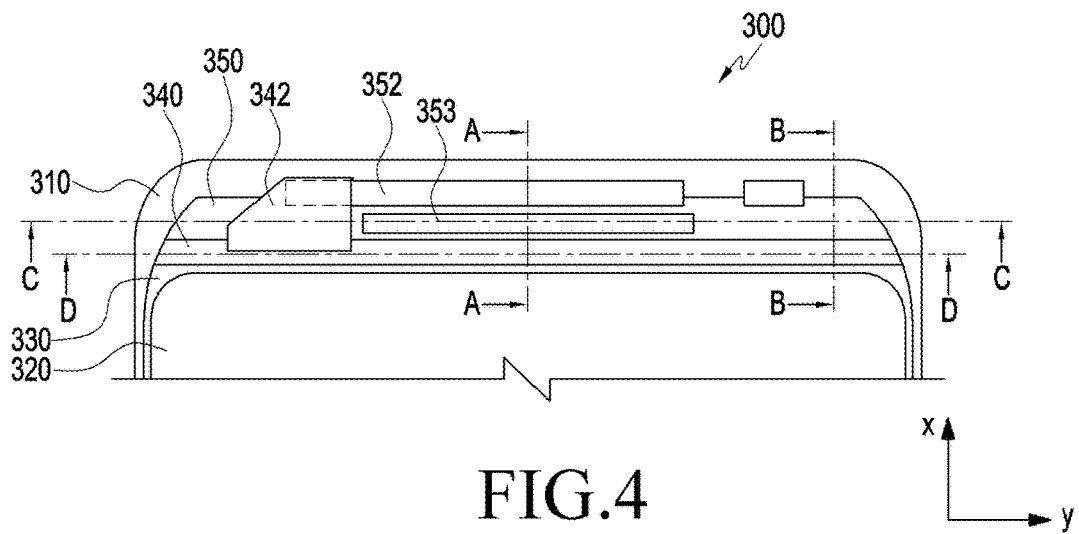
FIG. 4 is a top view illustrating an example display device according to an embodiment.
Figure 5:
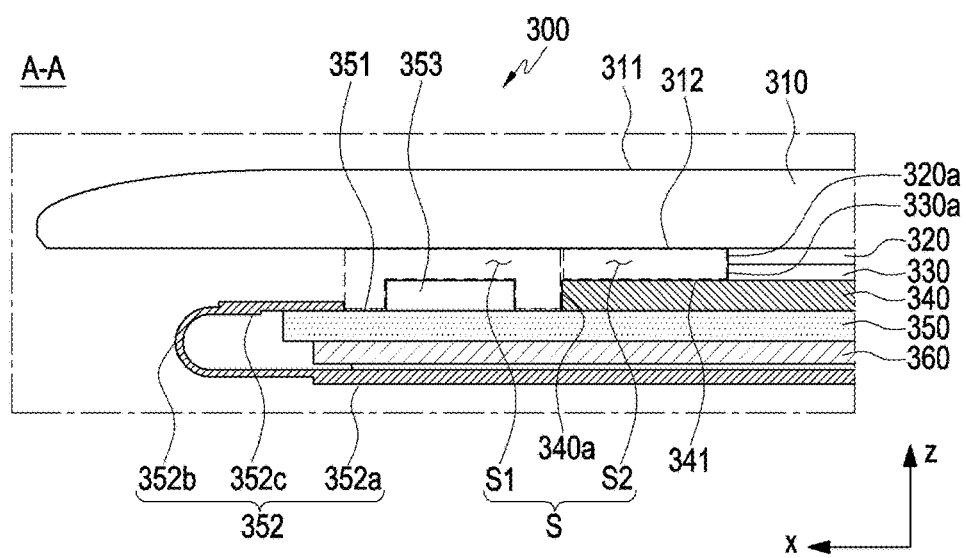
FIG. 5 is a cross-sectional view taken along line A-A of FIG. 4.
Figure 6:
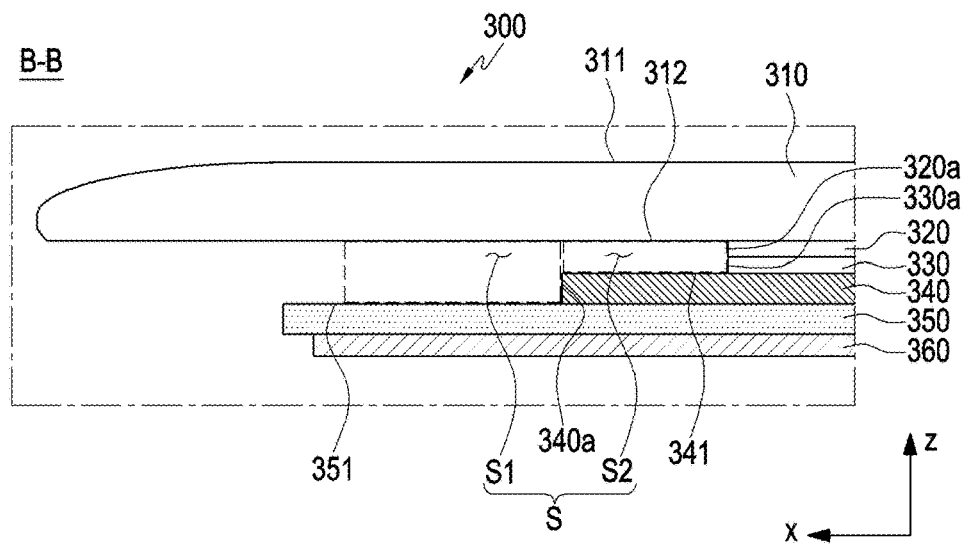
FIG. 6 is a cross-sectional view taken along line B-B of FIG. 4.
Figure 7A:
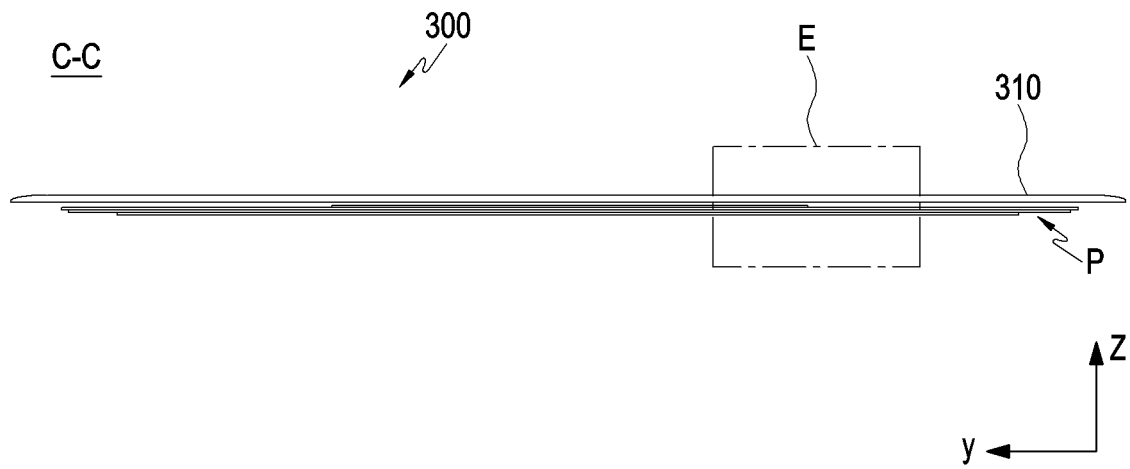
FIG. 7A is a cross-sectional view taken along line C-C of FIG. 4.
Figure 7B:
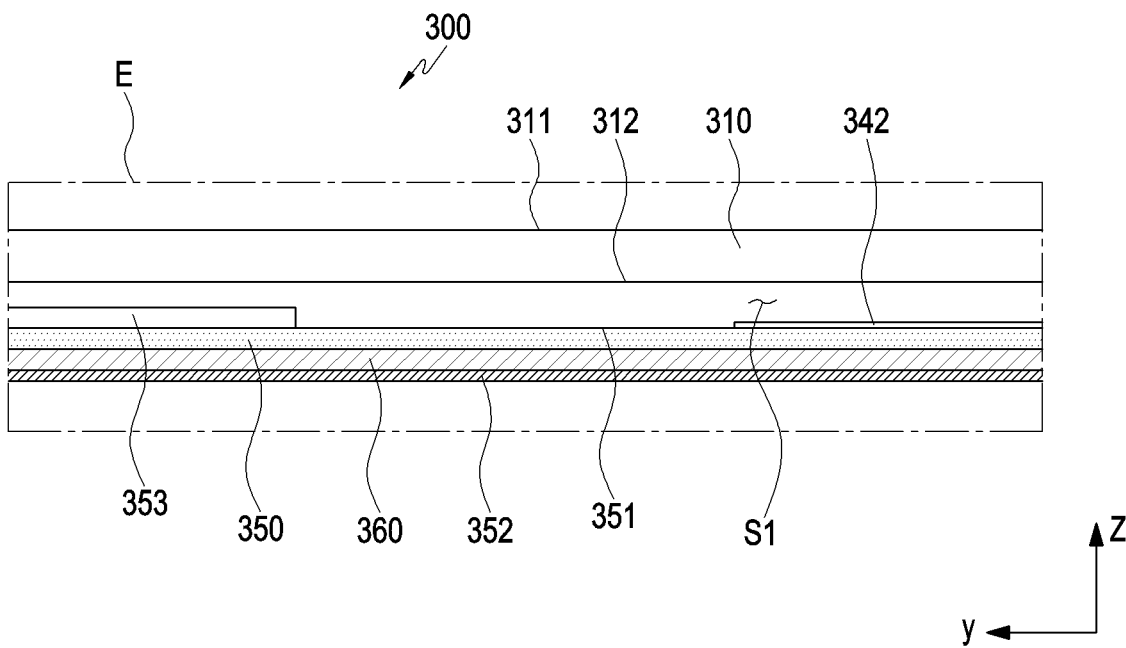
FIG. 7B is an enlarged view illustrating portion E of FIG. 7A.
Figure 8A:
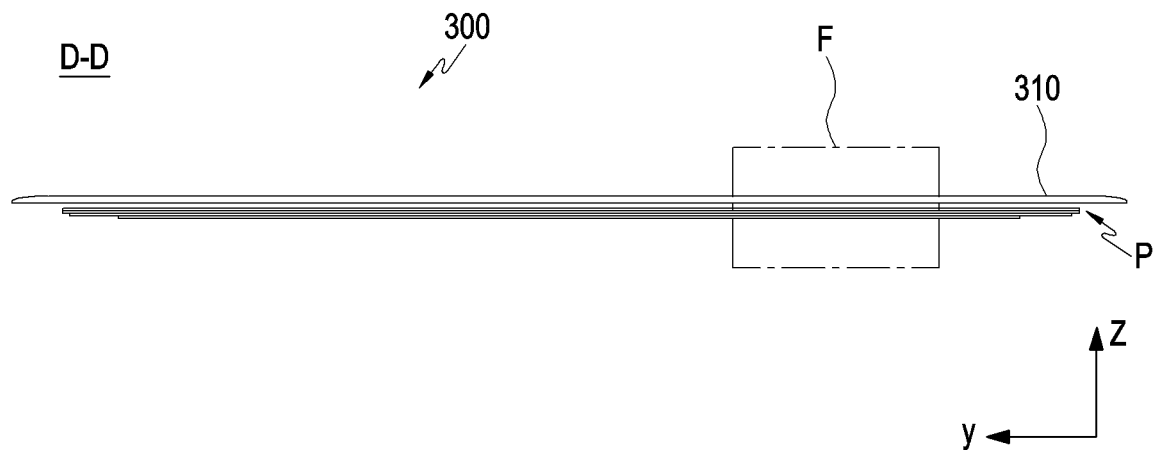
FIG. 8A is a cross-sectional view taken along line D-D of FIG. 4.
Figure 8B:
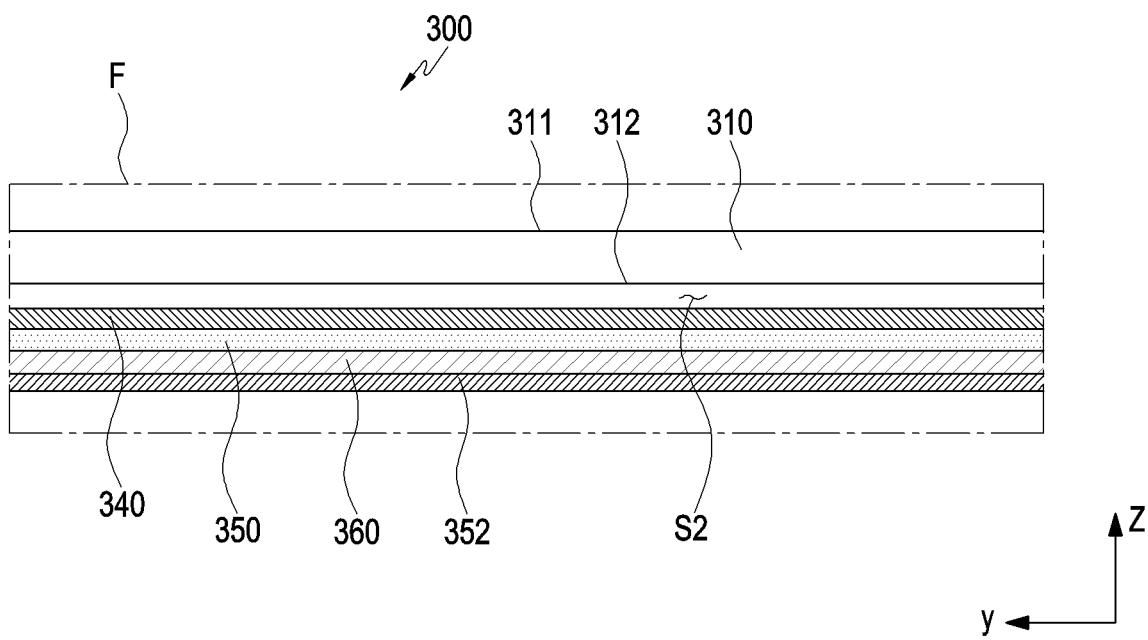
FIG. 8B is an enlarged view illustrating portion F of FIG. 8A.

FIG. 4 is a top view illustrating an example display device 300 according to an embodiment. FIG. 5 is a cross-sectional view taken along line A-A of FIG. 4. FIG. 6 is a cross-sectional view taken along line B-B of FIG. 4. FIG. 7A is a cross-sectional view taken along line C-C of FIG. 4. FIG. 7B is an enlarged view illustrating portion E of FIG. 7A. FIG. 8A is a cross-sectional view taken along line D-D of FIG. 4. FIG. 8B is an enlarged view illustrating portion F of FIG. 8A.

According to the embodiment illustrated in FIG. 4, in the display device 300, the second substrate 340 is stacked on the top surface of the first substrate 350, the light-polarizing member 330 is stacked on the top surface of the second substrate 340, and the optical adhesive member 320 is stacked on the top surface of the light-polarizing member 330. According to an embodiment, with the second substrate 340 stacked on at least part of the first substrate 350, the first circuit board 352 and the second circuit board 342 may be electrically connected to the respective ends of the first substrate 350 and the second substrate 340. According to an embodiment, the electronic component 353 (e.g., a DDI) may be disposed on a portion of the top surface of the first substrate 350. A substantially transparent window member 310 may be disposed on the top surface of the optical adhesive member 320.

Referring to FIGS. 4, 5 and 6, according to an embodiment, the display device 300 may have the window member 310, the optical adhesive member 320, the light-polarizing member 330, the second substrate 340, and the first substrate 350 stacked in order.

Referring to FIGS. 5 and 6, the window member 310 and the first substrate 350 may be spaced apart from each other with a space S formed therebetween. The space S may be a space where at least one of at least a portion of the first circuit board 352, at least a portion of the second circuit board 342, or the electronic component 353 may be disposed. For example, as in the embodiment shown in FIG. 5, the first circuit board 352 may include a portion 352a on the bottom surface of the first substrate 350, a bent portion 352b, and a portion 352c extending up to the space S on the top surface of the first substrate 350. By such a structure, the first circuit board 352 may implement an electrical connection between the electronic component (not shown) disposed on the bottom surface of the first substrate 350 and the electronic component 353 disposed on the top surface of the first substrate 350. According to an embodiment, the space S may be a space with a height substantially corresponding to the sum of the heights of the optical adhesive member 320, polarizing member 330, and second substrate 340 (hereinafter, elements 320, 330, and 340 are collectively referred to as a 'stack structure') disposed on the top surface of the first substrate 350.

According to an embodiment, the space S may result in a path along which a foreign body or moisture may infiltrate. According to an embodiment, the first substrate 350 may be damaged by the stepped structure of the space S. According to an embodiment, the space S may be sealed off by a filler (e.g., a resin).

According to an embodiment, a second space S2 may be formed between the top surface of the second substrate 340 and the window member 310 to be distinguished from a first space S1 between the first substrate 350 and the window member 310. According to an embodiment, as the first substrate 350 extends beyond the second substrate 340, the first substrate 350 and the second substrate 340 may have areas where other components (e.g., electronic components) may be disposed on the respective top surfaces 341 and 351 of the first and second substrates 350 and 340. For example, the first circuit board 352 may be disposed on the top surface 351 of the first substrate 350, and the second circuit board 342 may be disposed on the top surface 341 of the second substrate 340. In arranging the first circuit board 352 and/or the second circuit board 342 on the first substrate 350 and/or the second substrate 340, an anisotropic conductive film (ACF) attaching scheme may be used.

According to an embodiment, if such a complicated structure as the first space S1 and the second space S2 distinguished from each other is formed between the display panels and the window member 310, a portion of the first space S1 and the second space S2 might not be filled despite sealing with a filler (e.g., a resin). Use of a low-viscosity filler to raise the filling rate may result in a higher chance of the filler flowing down along the side walls of the electronic device after fully filling the space S.

Figure 9:
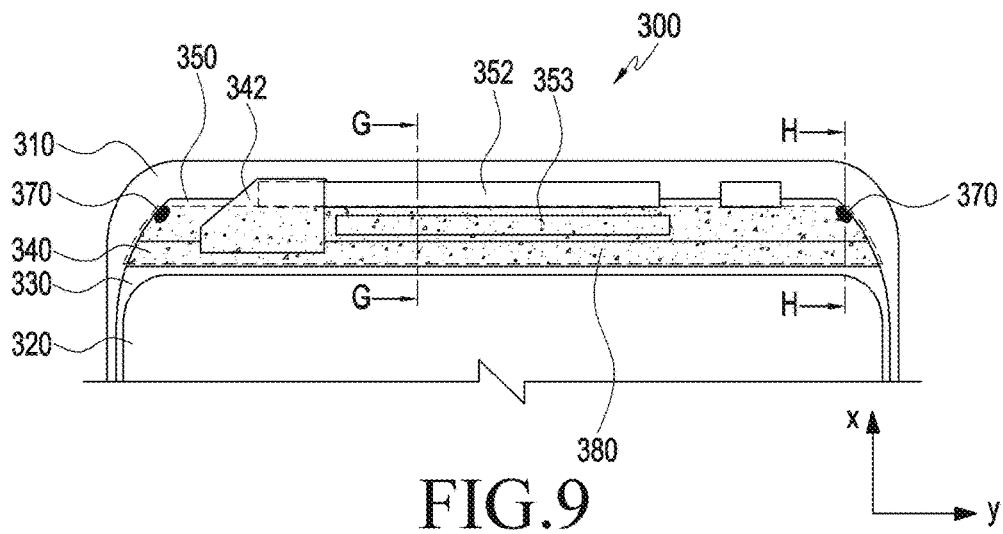
FIG. 9 is a diagram illustrating an example display device with a filler flow restricting structure and a filler according to another embodiment.
Figure 10:
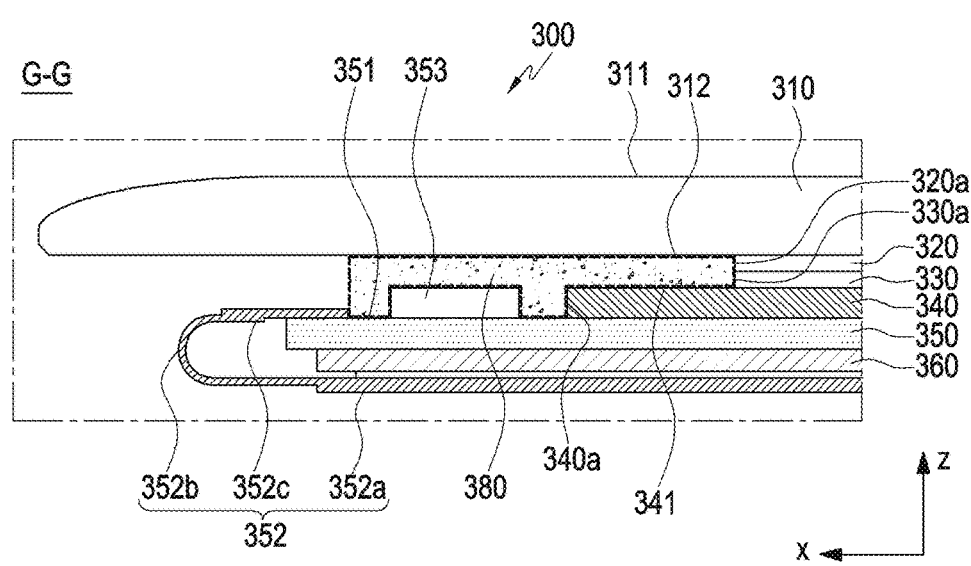
FIG. 10 is a cross-sectional view taken along line G-G of FIG. 9.
Figure 11:
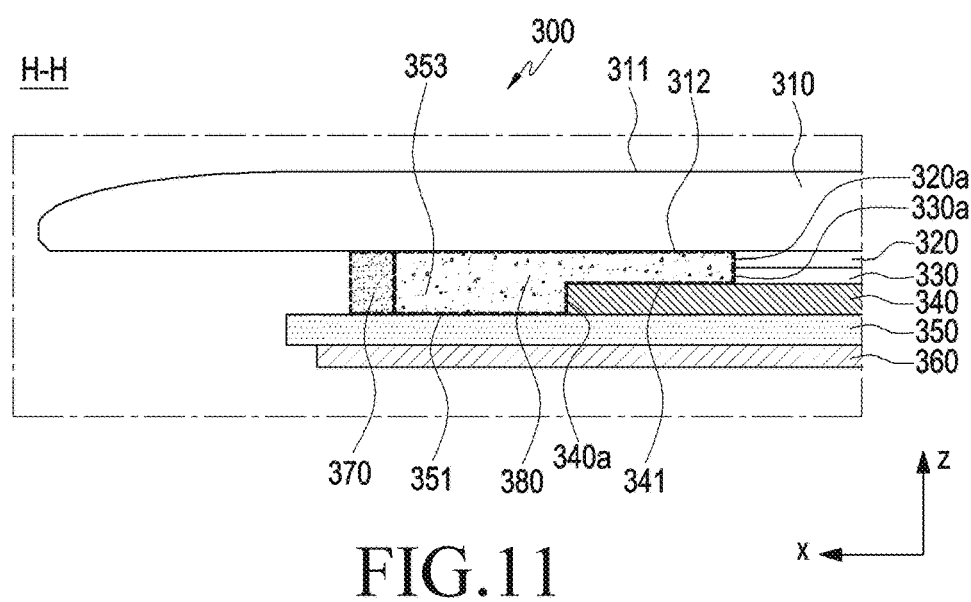
FIG. 11 is a cross-sectional view taken along line H-H of FIG. 9.

Described with reference to FIGS. 9, 10 and 11 is an example embodiment in which the filler flow restricting structure 370 and the filler 380 are provided in the display device 300.

FIG. 9 is a view illustrating an example of a display device 300 with a filler flow restricting structure 370 and a filler 380 according to another embodiment of FIG. 4. FIG. 10 is a cross-sectional view taken along line G-G of FIG. 9. FIG. 11 is a cross-sectional view taken along line H-H of FIG. 9.

According to the embodiment illustrated in FIGS. 9, 10 and 11, in the display device 300, the second substrate 340 is stacked on the top surface of the first substrate 350, the light-polarizing member 330 is stacked on the top surface of the second substrate 340, and the optical adhesive member 320 is stacked on the top surface of the light-polarizing member 330. According to an embodiment, with the second substrate 340 stacked on at least part of the first substrate 350, the first circuit board 352 and the second circuit board 342 may be electrically connected to the respective ends of the first substrate 350 and the second substrate 340. According to an embodiment, the electronic component 353 (e.g., a DDI) may be disposed on a portion of the top surface of the first substrate 350.

Referring to FIG. 9, in addition to the components shown in FIG. 4, the filler flow restricting structure 370 and the filler 380 may be included on the top surface 351 of the first substrate 350. The filler 380 positioned on the top surface 351 of the first substrate 350 may extend up to the top surface 341 of the second substrate 340. According to an embodiment, the filler 380 may seal off the stepped structure or discontinuous portion (e.g., the discontinuous portion caused by differences in thickness between the components of the display device) in the space S. For example, the filler 380 may be formed to contact one end 320a of the optical adhesive member 320, one end 330a of the light-polarizing member 330, one end 340a and top surface 341 of the second substrate 340, and the top surface 351 of the first substrate 350, thereby providing dust-proof and water-proof functionality.

According to an embodiment, the filler flow restricting structure 370 may be disposed on the space S1 between the window member 310 and the first substrate 350. According to an embodiment, the filler flow restricting structure 370 may be formed in a local area (e.g., L1 of FIG. 18 described below) of the first substrate 350 of the space S1. According to an embodiment, the local area may include at least a portion of the edge of the first substrate 350.

According to an embodiment, the filler flow restricting structure 370 may be formed, for example, and without limitation, using a light-cured material (e.g., ultraviolet (UV) resin), a thermosetting material, a moisture-cured material, a semi-solid material, an elastic resin, or the like. According to an embodiment, the material may be an ink, a resin, or the like. According to an embodiment, when the filler flow restricting structure 370 is formed using a light-cured material (e.g., a UV resin), a high-viscosity light-cured material may be applied to the local area of the first substrate 350 using a nozzle and then exposed to UV rays for a predetermined time to be cured. According to an embodiment, when the filler flow restricting structure 370 is formed using an elastic resin (e.g., sponge), the elastic resin may be disposed on the local area of the first substrate 350 using tweezers.

According to an embodiment, the filler flow restricting structure 370 may be provided in a corner of the edge of the first substrate 350 as viewed from above the top surface of the first substrate 350 as shown in FIG. 9. For example, as compared with when the filler flow restricting structure 370 is formed in the internal center of the first substrate 350, it may be more advantageous in preventing air from remaining when the filler flow restricting structure 370 is locally formed only in the corner of the edge of the first substrate 350. Further, such an embodiment may be more advantageous in light of process difficulty and cost savings.

According to an embodiment, the filler 380 may be formed using, for example, and without limitation, a light-cured material, a thermosetting material, a moisture-cured material, a semi-solid material, or the like. According to an embodiment, when the filler 380 is formed using a light-cured resin, a relatively low-viscosity light-cured resin as compared with the filler flow restricting structure 370 may be injected using a nozzle. When the filler 380 is formed of a UV resin, this also requires exposure to UV and curing for a predetermined time. Curing the filler 380 may take longer than curing the filler flow restricting structure 370. Since the filler 380 is formed in a relatively large area as compared with the filler flow restricting structure 370 and may be densely disposed along the surface of the complicated internal structure of the space S, the elastic resin used to form the filler flow restricting structure 370 might not be used. According to an embodiment, the viscosity of the filler 380 may be prominently lower than the viscosity of the filler flow restricting structure 370. For example, the filler 380 may have a viscosity of 300 cps, and the filler flow restricting structure 370 may have a viscosity of, for example, 3,000 cps. The values are merely examples and may be varied to other ones given various parameters, such as the curing time and coupling strength of the display.

Referring to FIGS. 10 and 11, in the area or section where the optical adhesive member 320 is disposed, the display panels and the window member 310 may be brought in tight contact with each other, preventing and/or reducing influx of a foreign body or moisture. On the other hand, a path along which a foreign body or moisture may enter may be formed in the first space (e.g., S1 of FIG. 5) and the second space (e.g., S2 of FIG. 5) between the window member 310 and the display panels. According to an embodiment, the display device 300 includes the filler 380 filling the first space S1 and/or second space S2, thereby blocking off influx of a foreign body or moisture. For example, the filler 380 may be formed to contact one end 320a of the optical adhesive member 320, one end 330a of the light-polarizing member 330, one end 340a and top surface 341 of the second substrate 340, and the top surface 351 of the first substrate 350, thereby providing dust-proof, water-proof functionality.

According to an embodiment, the display device 300 may be configured to have the filler 380 between the filler flow restricting structure 370 and at least one of the optical adhesive member 320, the light-polarizing member 330, and the second substrate 340.

According to an embodiment, the filler 380 may be disposed between the filler flow restricting structure 370 and one end 320a of the optical adhesive member 320. Alternatively, the filler 380 may be disposed between the filler flow restricting structure 370 and one end 330a of the light-polarizing member 330. Alternatively, the filler 380 may be disposed between the filler flow restricting structure 370 and one end 340a of the second substrate 340.

According to an embodiment, the filler flow restricting structure 370 may be configured not to contact at least one of the optical adhesive member 320, the light-polarizing member 330, and the second substrate 340. In other words, the local area where the filler flow restricting structure 370 is formed may be spaced apart at a predetermined (e.g., specified) distance from at least one of the optical adhesive member 320, the light-polarizing member 330, and the second substrate 340. The position where the filler flow restricting structure 370 is formed is described below in detail with reference to FIGS. 16, 17, 18A and 18B.

Since such elements sensitive to variations in external environment as the above-described first substrate 350, second substrate 340, polarizing member 330, and optical adhesive member 320 are arranged inside the display device 300; the product may be complete by filling the internal space to thereby address the issues with performance deterioration or damage vulnerability. Use of a common way to fill the internal space may cause air to remain inside the space.

According to an embodiment, after the filler flow restricting structure 370 is formed not to contact at least a portion of the internal stack structure of the display device 300 to fill the internal space, the filler 380 is formed to densely fill the internal space while preventing an air trap. This way may prevent and/or reduce issues that arise when the common method to fill the internal space is used.

Figure 12A:
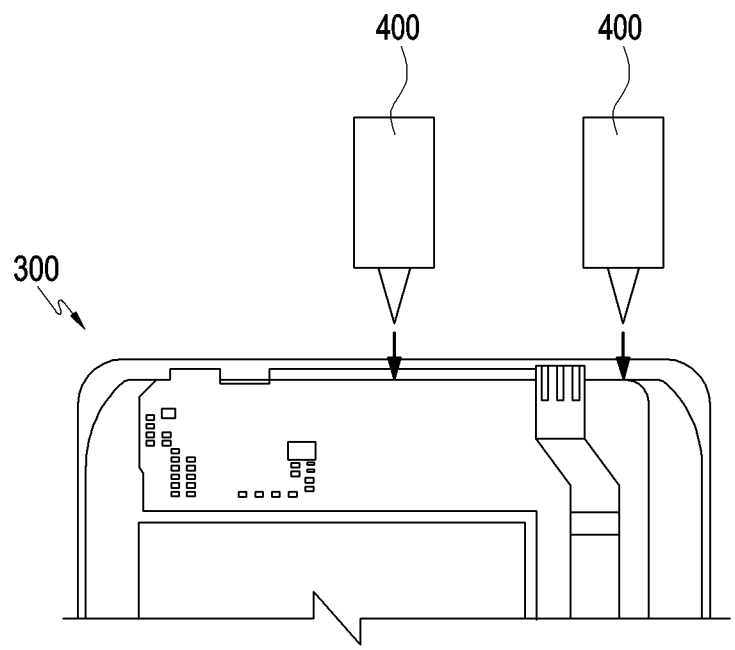
FIGS. 12A and 12B are diagrams illustrating an example of filling with a filler according to an embodiment.
Figure 12B:
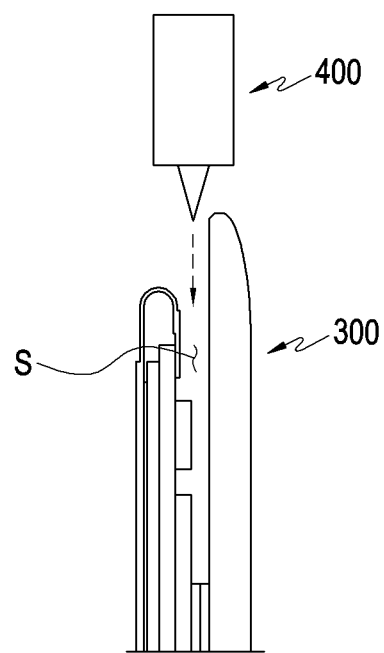
Figure 13A:
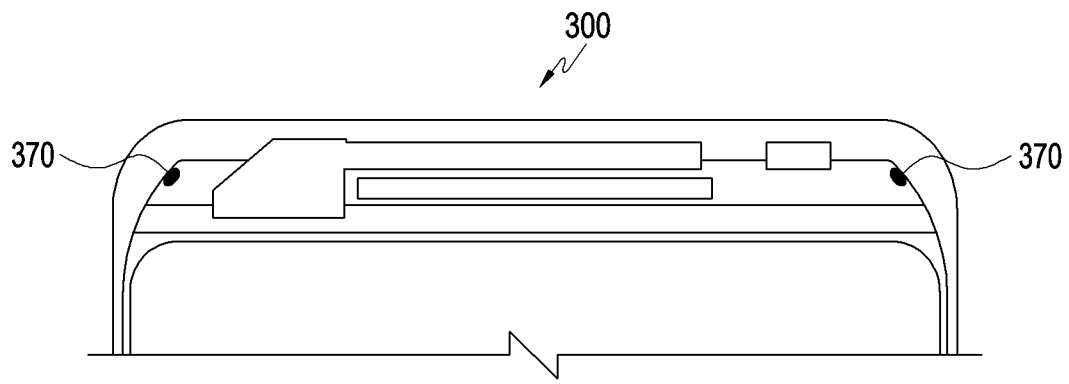
FIGS. 13A, 13B and 13C are diagrams illustrating an example process of providing a filler to a display device with a filler flow restricting structure according to an embodiment.
Figure 13B:
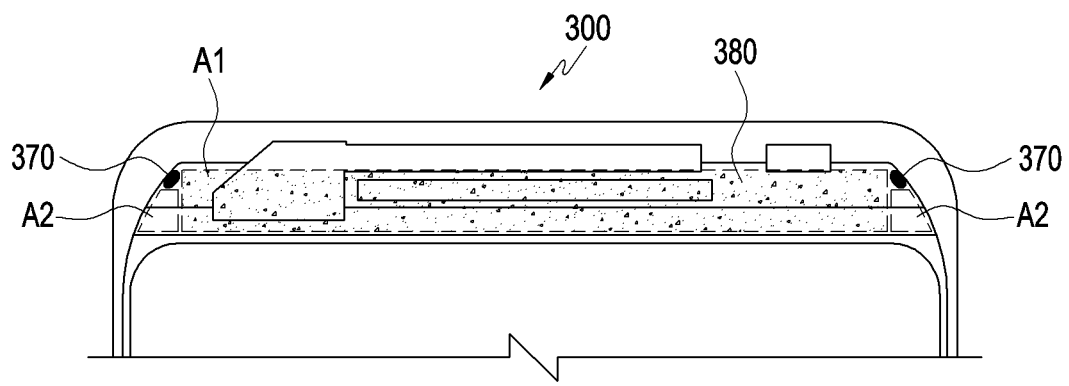
Figure 13C:
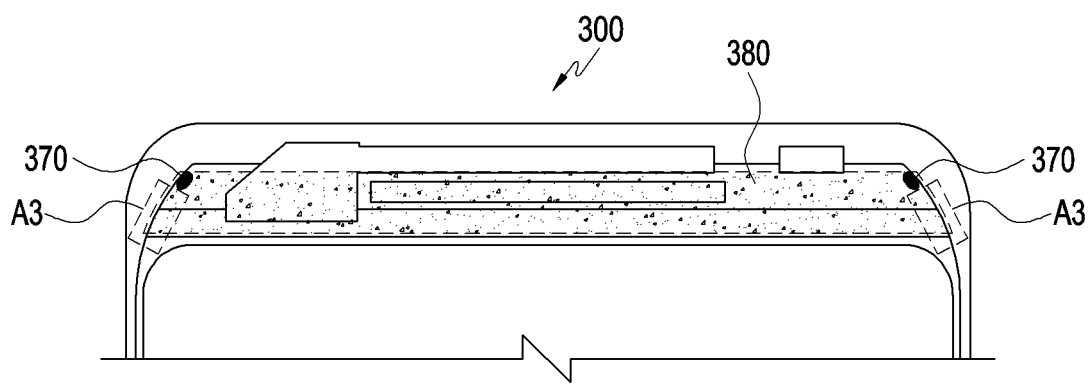
Figure 14:
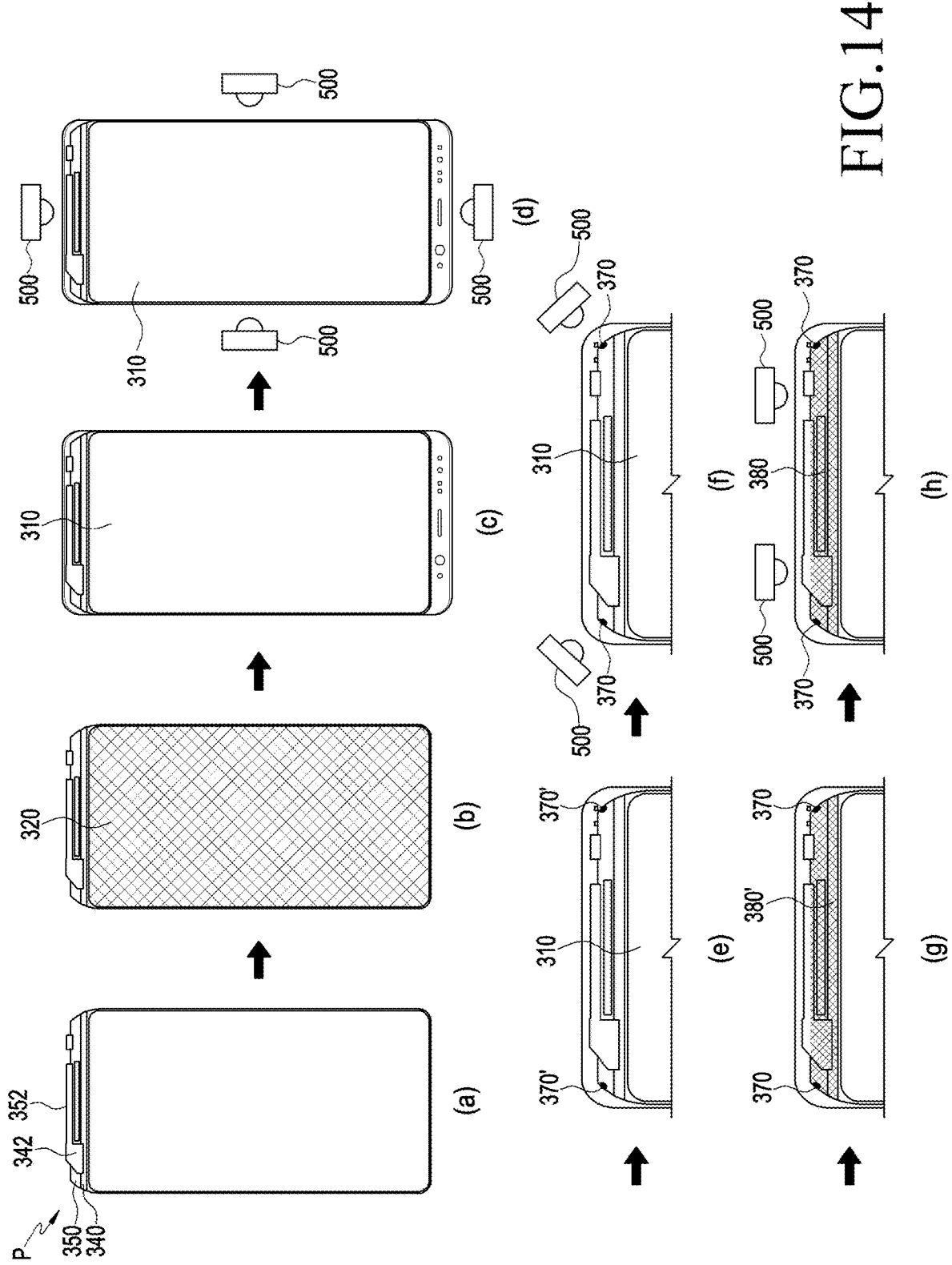
FIG. 14 is a diagram illustrating an example method of manufacturing a display device according to an embodiment.
Figure 15:
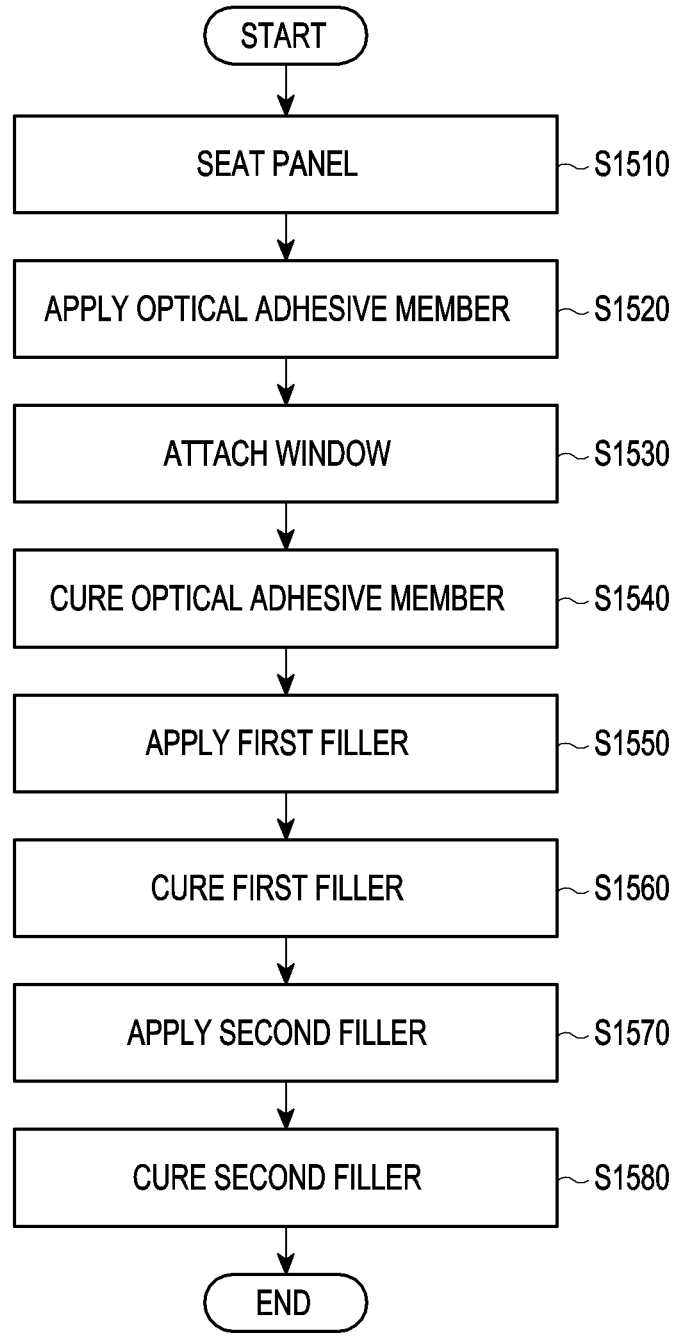
FIG. 15 is a flowchart illustrating an example method of manufacturing a display device according to an embodiment.

FIGS. 12A and 12B are diagrams illustrating an example of filling with a filler (e.g., 380 of FIG. 9) according to an embodiment. FIGS. 13A, 13B and 13C are diagrams illustrating an example process of providing a filler 380 to a display device 300 with a filler flow restricting structure 370 according to an embodiment. FIG. 14 is a diagram illustrating an example method of manufacturing a display device 300 according to an embodiment. FIG. 15 is a flowchart illustrating an example method of manufacturing a display device 300 according to an embodiment.

Referring to FIGS. 12A and 12B, to fill the space S with the filler 380, the display device 300 may be allowed to stand upright, and a low-viscosity, liquid filler (e.g., a resin) may be injected into the space S via the nozzle 400. In this case, the space S shown in FIG. 12 may start to be filled with the filler from the lowest position of the space S. After filling up to a target height, the filler may be cured and thus fastened (solidified) on the space S. The conventional common filling method may cause the overfilled filler 380 to flow down along the side surface of the display device before and/or at the time of curing.

FIGS. 13A, 13B and 13C illustrate an example embodiment for preventing and/or reducing the filler 380 from flowing down during the course of forming the filler 380. According to an embodiment, after the filler flow restricting structure 370 is formed in the local area as shown in FIG. 13A, the filler 380 may be formed as shown in FIGS. 13B and 13C. Referring to FIG. 13B, for example, if the nozzle (e.g., 400 of FIGS. 12A and 12B) is positioned in the center of the bottom (or top) of the display device 300 and injects the filler, the filler may start to fill one area A1 at the same speed on the left/right along the space (e.g., S of FIG. 8) unless a special occasion occurs otherwise (here, the filling speed of the filler may be varied if such components as electronic components or circuit boards are in the space S). Referring to FIG. 13C, the filler may contact the filler flow restricting structure 370 and then fill up to the offset area A2 positioned under the filler flow restricting structure 370. Referring to FIGS. 13A, 13B and 13C, during the process of forming the filler 380 in the space S, the filler may be brought in tight contact with the filler flow restricting structure 370 and may thus fill the offset area A2 densely. This may prevent and/or reduce the filler from flowing down along the side area A3 of the display device.

Referring to FIGS. 14 and 15, according to an embodiment, a method of manufacturing the display device 300 may include attaching the optical adhesive member 320 to the display panels (e.g., indicated by reference numbers 340 and 350) (S1520), curing (S1540), forming the filler flow restricting structure 370 (S1550), curing (S1560), filling with the filler 380 (S1570), and curing (S1580).

According to an embodiment, the method may include seating the display panel (e.g., the first substrate 350 and/or the second substrate 340 of FIG. 3) (or preparing the display panel (S1510)) before attaching the optical adhesive member 320 to the display panels and curing. In this process, the first substrate 350 and the second substrate 340 may be stacked one over another and may be electrically connected with the first circuit board 352 and the second circuit board 342, respectively.

In relation to operation S1520, according to an embodiment, the optical adhesive member 320 may be attached onto the top surface of the second substrate 340. According to an embodiment, a light-polarizing member (e.g., 330 of FIG. 8) may be disposed between the optical adhesive member 320 and the second substrate 340. The optical adhesive member 320 may be formed by applying, for example, and without limitation, OCR, SVR, another thermosetting resin, or the like, on the top surface of the second substrate 340.

According to an embodiment, the method may add the operation of attaching the window member 310 (S1530) between operation S1520 and operation S1540, thereby forming a space (e.g., S of FIG. 8) between the window member 310 and the display panel 340 and 350.

According to an embodiment, curing (S1540) the optical adhesive member 320 after the operation S1530 of attaching the window member 310 may reinforce the durability of the combined structure of the window member 310 and the display panels. For example, when the optical adhesive member 320 is formed of a photosensitive material (e.g., a UV ink or resin), the front/rear/left/right surfaces of the display panels may be UV-polymerized (or cross-linked) using a polymerizer 500.

In relation to operations S1550 and S1560, according to an embodiment, a light-cured material 370' may be applied to the local area of the first substrate 350, and the area where the material 370' is formed may be cured using the polymerizer 500, thereby forming the filler flow restricting structure 370.

In relation to operations S1570 and S1580, a light-cured material 380' may be injected into the space S on top of the first substrate 340 and the second substrate 340, and the area where the material 380' is formed may be cured using the polymerizer 500, thereby forming the filler 380.

In the above-described embodiment, the material 380' used in operation S1570 may have a relatively low viscosity as compared with the material 370' used in operation S1550. According to an embodiment, curing S1560 may take longer than curing S1580.

Figure 16:
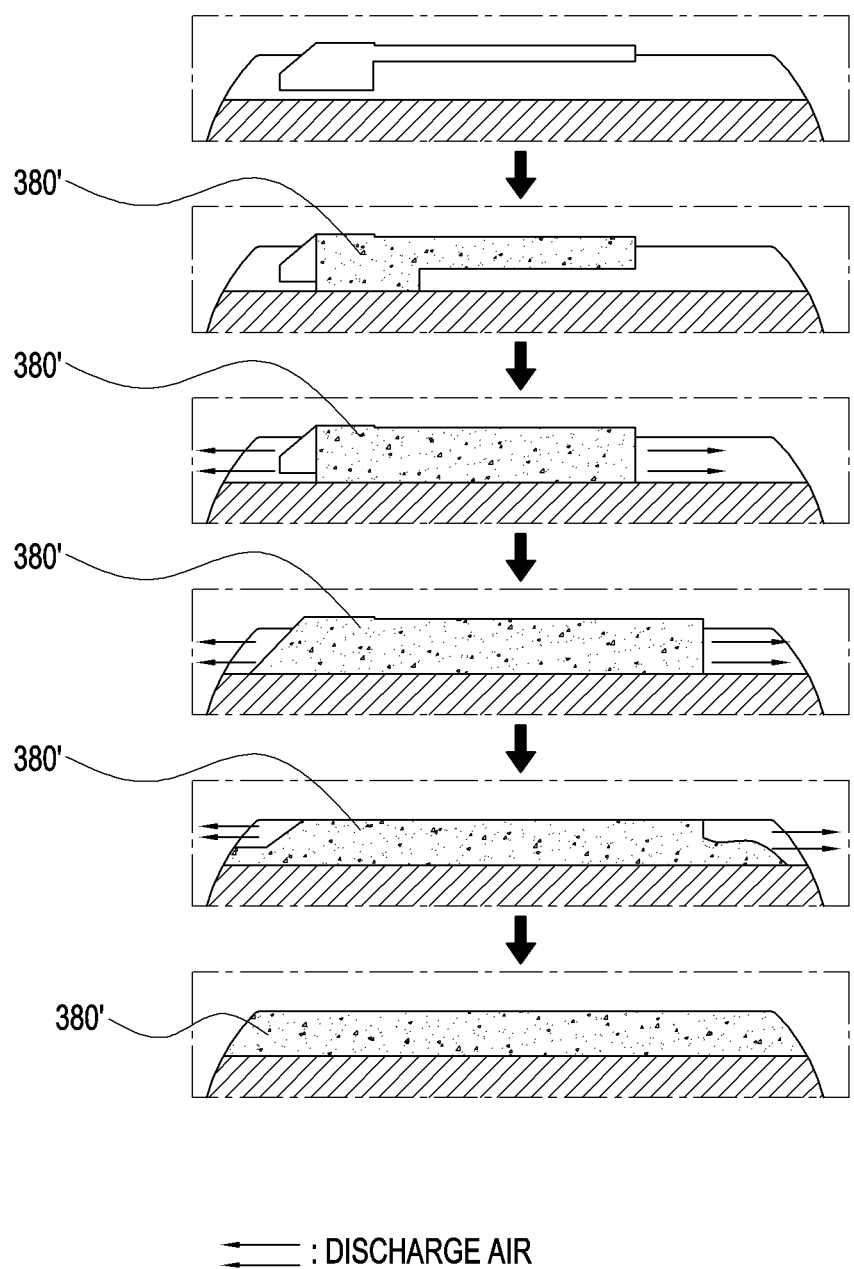
FIG. 16 is a diagram illustrating an example of discharging air remaining inside a display device including a filler flow restricting structure and a filler according to an embodiment.
Figure 17:
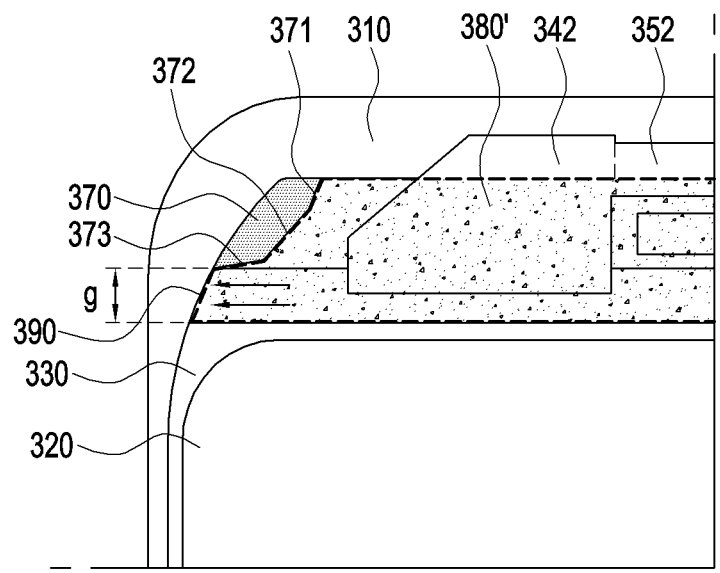
FIG. 17 is a diagram illustrating a principle for discharging air remaining inside a display device according to an embodiment.
Figure 18A:
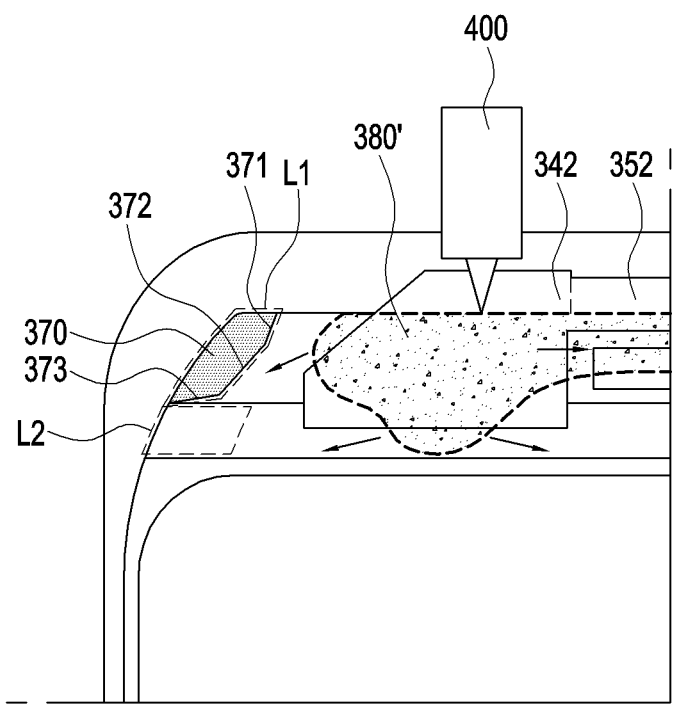
FIGS. 18A and 18B are diagrams illustrating an example of discharging air remaining inside a display device according to an embodiment.
Figure 18B:
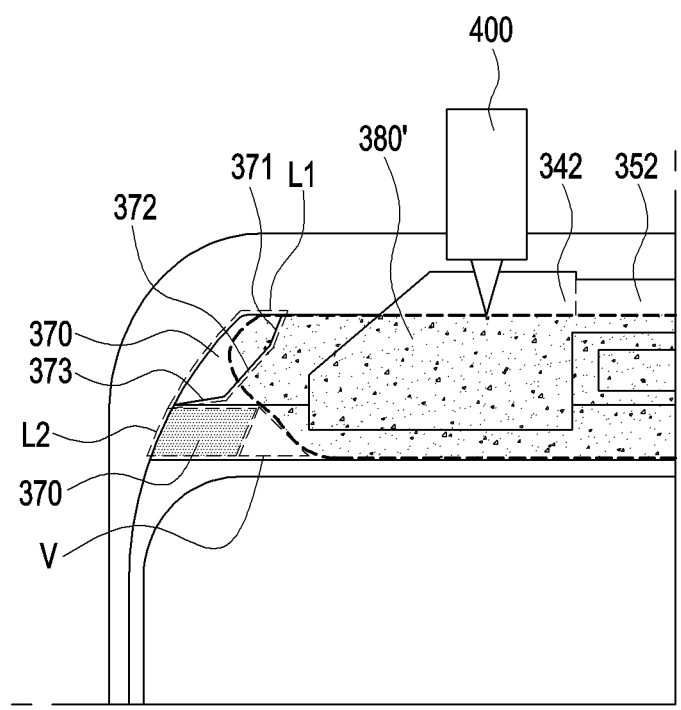

FIG. 16 is a diagram illustrating an example of discharging air remaining inside a display device (e.g., 300 of FIG. 3) including a filler flow restricting structure 370 and a sealing member 380 according to an embodiment. FIG. 17 is a diagram illustrating an example principle for discharging air remaining inside a display device (e.g., 300 of FIG. 3) according to an embodiment. FIGS. 18A and 18B are diagrams illustrating an example principle for discharging air remaining inside a display device (e.g., 300 of FIG. 3) according to an embodiment.

Referring to FIGS. 16 and 17, for example, if the bottom (or top) of the display device (e.g., 300 of FIG. 3) is sealed off and a nozzle (e.g., 400 of FIGS. 12A and 12B) is positioned in the center of the bottom (or top) of the display device 300, the nozzle can inject filler 380' and the filler 380' may start to fill one area (e.g., A1 of FIG. 13B) of a space (e.g., S2 of FIG. 8B). The filler 380' may contact the filler flow restricting structure 370 and then fill up the offset area (e.g., A2 of FIG. 13B) positioned under the filler flow restricting structure 370. During this process, the air present in the space (e.g., S2 of FIG. 8B) may be discharged through the path 390 formed in the side surface of the display device (e.g., 300 of FIG. 3). Referring to FIG. 17, the gap g of the path 390 may be a tiny opening which is about 1 mm wide.

As in the embodiment shown in FIG. 17, the filling area of the filler 380' may gradually expand from the tip of the nozzle to its surroundings. According to an embodiment, the filler 380' may first contact the inclined portion 371 of the side surface of the filler flow restricting structure 370. Thereafter, the filler 380' may travel while contacting other inclined portions 372 and 373 adjacent to the inclined portion 371. By the viscosity effect between the filler 380' and the filler flow restricting structure 370, the space (e.g., S of FIG. 5) including the surrounding areas of the filler flow restricting structure 370 may be densely filled with the filler. The shape of the filler flow restricting structure 370 is not limited to that shown. For example, the cross section of the filler flow restricting structure 370 may have various shapes, such as, for example, and without limitation, a circle, ellipse, rectangle, or the like.

According to an embodiment, as the local area L1 (see, e.g., FIG. 18A) where the filler flow restricting structure 370 is formed is formed in an area which is not positioned adjacent at least one of the optical adhesive member (e.g., 320 of FIG. 3), the light-polarizing member (e.g., 330 of FIG. 3), and the second substrate (e.g., 340 of FIG. 3), a path 390 with a predetermined size may be formed. The filler 380 may be disposed between the filler flow restricting structure 370 and any one of the optical adhesive member (e.g., 320 of FIG. 3), polarizing member (e.g., 330 of FIG. 3), and the second substrate (e.g., 340 of FIG. 3). The process of forming the filler 380 may completely discharge the air from the inside of the display device 300 or electronic device (e.g., 100 of FIG. 1A), thus preventing and/or reducing the air trap phenomenon.

For example, when the filler flow restricting structure 370 is formed in area L2 as shown in FIG. 18B, the filler flow restricting structure 370 may come in contact with all of the optical adhesive member (e.g., 320 of FIG. 3), the light-polarizing member (e.g., 330 of FIG. 3), and the second substrate (e.g., 340 of FIG. 3). In this case, there may be formed a space V where the air remains between the direction of progress of the filler 380' injected from the nozzle and the area where the filler flow restricting structure 370 is formed.

According to an embodiment, the filler flow restricting structure 370 may be formed so that at least one side surface thereof is inclined with respect to at least one of the optical adhesive member 320, the light-polarizing member 330, or the second substrate 340. For example, the filler flow restricting structure 370 may include at least one inclined side surface 371, 372, and 373 as shown in FIG. 17. There may be two or more inclined side surfaces depending on the component of the filler flow restricting structure 370 or the filler 380 to control the filling speed and position of the second filler.

Figure 19A:
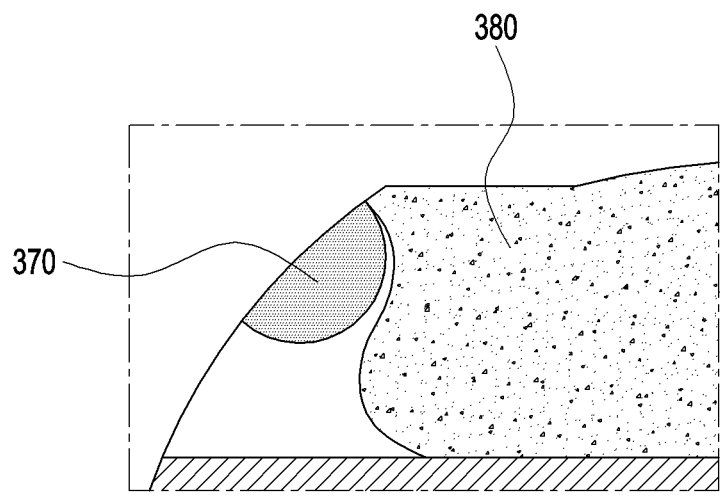
FIGS. 19A, 19B and 19C are diagrams illustrating an example of controlling the degree of filling with a filler by surface friction between a filler flow restricting structure and the filler according to an embodiment.
Figure 19B:
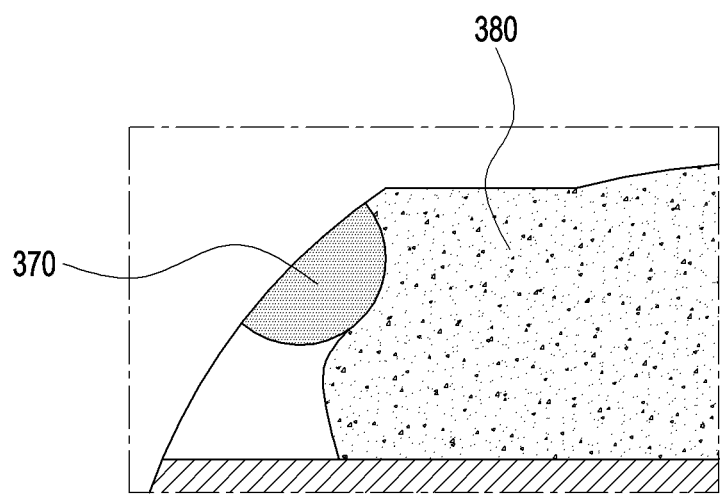
Figure 19C:
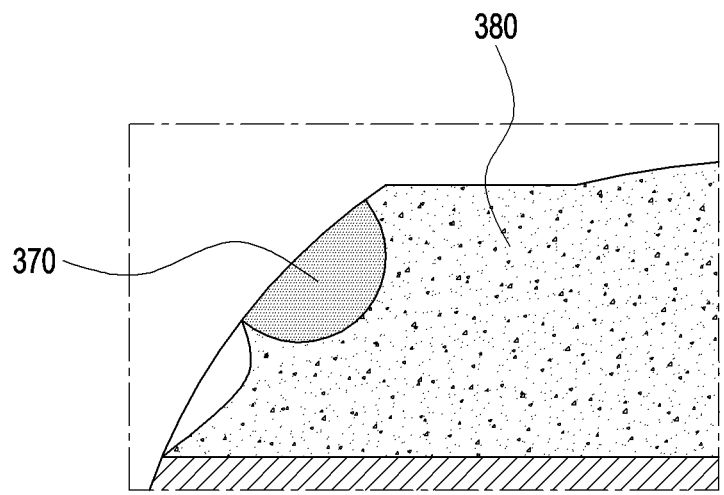

FIGS. 19A, 19B and 19C are diagrams illustrating an example of controlling the degree of filling a filler 380 by the surface friction between a filler flow restricting structure 370 and the filler 380 according to an embodiment. The filler 380 may refer, for example, to a filler (e.g., 380' of FIGS. 17, 18A and 18B) before being cured. According to an embodiment, it is possible to control the filler (e.g., resin) not to flow down the side surface of the electronic device using the viscosity between the filler flow restricting structure 370 and the filler 380. As the viscous filler (e.g., a gap filling dispenser (GFD)) may meet the filler flow restricting structure 370 and contact the surface of the filler flow restricting structure 370 as shown in FIGS. 19A, 19B and 19C, the moving speed and filling area of the filler may be controlled. According to an embodiment, since the local area where the filler flow restricting structure 370 is formed is formed in the area L1 shown in FIG. 18A, the filler may touch the filler flow restricting structure 370 and then expand to the space under the filler flow restricting structure 370. As such, the moving speed of the filler may be adjusted by the filler flow restricting structure 370.

Figure 20:
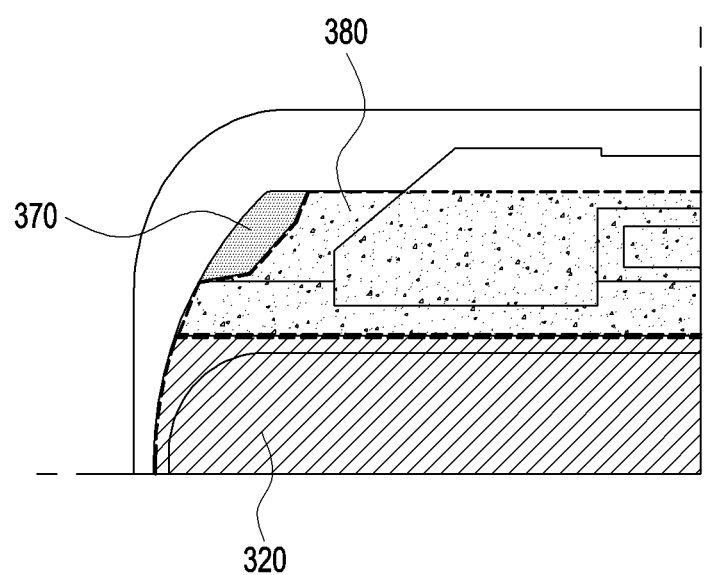
FIG. 20 is a diagram illustrating the material of a filler flow restricting structure, a filler, and an optical adhesive member according to an embodiment.

FIG. 20 is a diagram illustrating the material of a filler flow restricting structure 370, a filler 380, and an optical adhesive member 320 according to an embodiment.

Figure 21:
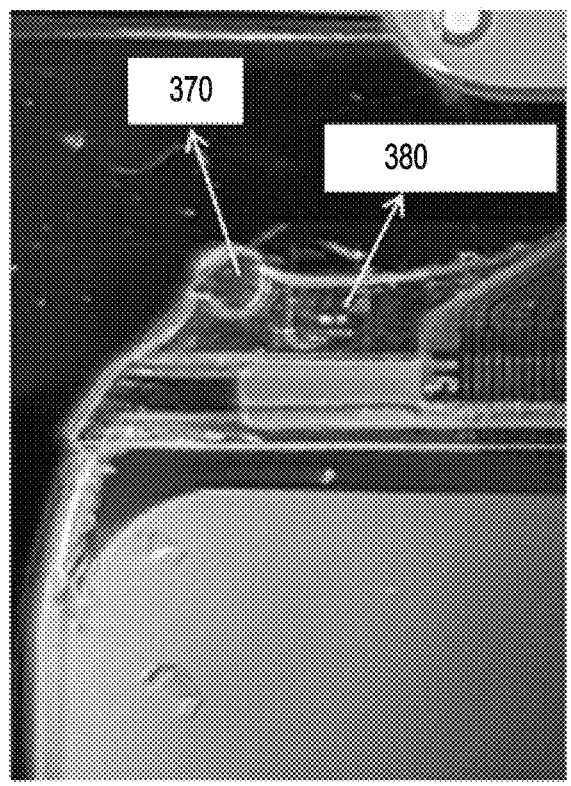
FIG. 21 is a photo illustrating differences in texture between a filler flow restricting structure and a filler according to an embodiment.

FIG. 21 is a photo illustrating differences in texture between a filler flow restricting structure and a filler according to an embodiment.

According to an embodiment, the filler flow restricting structure 370 may be formed, for example, using a hydrophilic or hydrophobic material, and the filler 380 may be formed, for example, using a material with the opposite polarity of the filler flow restricting structure 370. For example, when the filler flow restricting structure 370 is formed of a hydrophilic material, the filler 380 may be formed of a hydrophobic material. When the filler flow restricting structure 370 is formed of a hydrophobic material, the filler 380 may be formed of a hydrophilic material. Thus, a boundary may be made between the filler flow restricting structure 370 and the filler 380, and the filling speed and position of the second filler depending on the difference in material between the filler flow restricting structure 370 and the filler 380 may be easily controlled.

According to an embodiment, the optical adhesive member 320 may have the same polarity as the filler 380. For example, when the filler flow restricting structure 370 is formed of a hydrophilic material, the filler 380 may be formed of a hydrophobic material, and the optical adhesive member 320 may be formed of a hydrophobic material with the same polarity as the filler 380.

As such, allowing the optical adhesive member 320 to have the same polarity as the filler 380 may prevent the boundary between different components from being unnecessarily visible from the outside of the display device 300.

Figure 22:
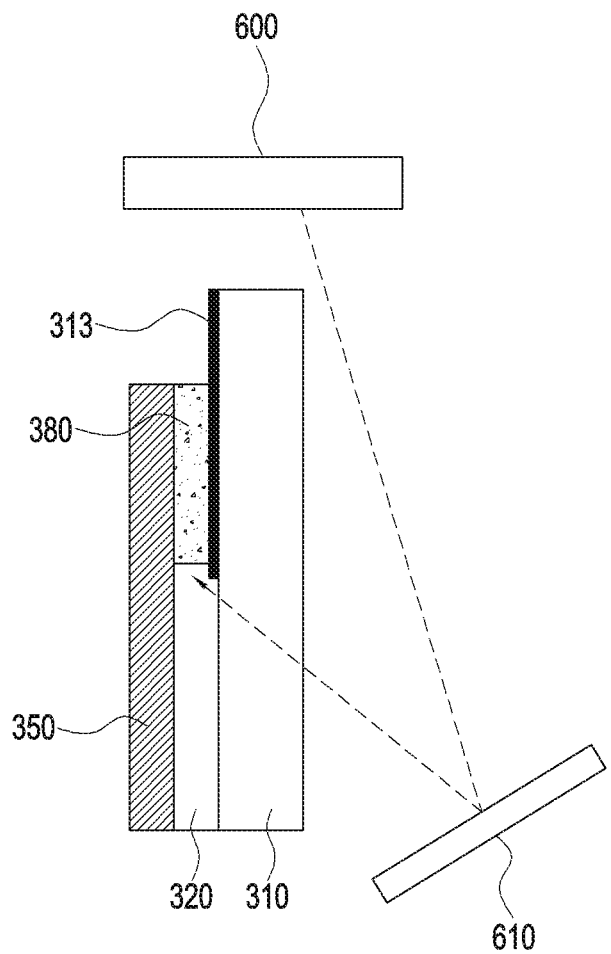
FIG. 22 is a diagram illustrating an example method of curing a filler flow restricting structure and a filler according to an embodiment.

FIG. 22 is a diagram illustrating an example method of curing a filler flow restricting structure 370 and a filler 380 according to an embodiment.

According to an embodiment, a curing method using at least one light source 600 and at least one reflecting mirror 610 may be used to cure the filler flow restricting structure 370 and the filler 380. According to an embodiment, a shielding layer 313 may be formed on the bottom surface of the window member 310, deteriorating the efficiency of the polarizer (e.g., 500 of FIG. 14).

According to an embodiment, since a great amount of thermosetting resin may be used in the process of manufacturing a display device (e.g., 300 of FIG. 3) and an electronic device (e.g., 100 of FIG. 1A) including the same, a need exists for a quick and efficient curing method. Accordingly, the curing method using at least one light source 600 and at least one reflecting mirror 610 may apply.

According to an embodiment, a display device 300 comprises a window member (e.g., a window) 310, a first substrate 350 spaced apart from the window member 310 to define a space S, an optical adhesive 320 disposed between the window member 310 and the first substrate 350 attaching the window member 310 with the first substrate 350, and a filler flow restricting structure 370 disposed on the space S between the window member 310 and the first substrate 350 and provided in a specified area L1 of the first substrate 350.

According to an embodiment, the specified area L1 may include at least a portion of an edge of the first substrate 350.

According to an embodiment, the filler flow restricting structure 370 may comprise at least one of a light-cured material, a thermosetting material, a moisture-cured material, a semi-solid material, or an elastic resin.

According to an embodiment, the filler flow restricting structure 370 may be provided in a corner of both end edges of the first substrate 350 when viewed from above an upper surface of the first substrate 350.

According to an embodiment, the display device may further comprise a filler 380 at least partially contacting the filler flow restricting structure 370 and sealing the space between the window member 310 and the first substrate 350.

According to an embodiment, the filler 380 may be comprise at least one of a light-cured material, a thermosetting material, a moisture-cured material, or a semi-solid material.

According to an embodiment, the filler flow restricting structure 370 may be comprise at least one of a hydrophilic material or a hydrophobic material, and the filler 380 may be comprise a material having a polarity different from a polarity of the filler flow restricting structure 370.

According to an embodiment, the optical adhesive member may have the same polarity as the filler.

According to an embodiment, the filler 380 may have a viscosity lower than a viscosity of the filler flow restricting structure 370.

According to an embodiment, the display device may further comprise a second substrate 340 abutting at least a portion of the first substrate 350 and configured to provide touchscreen functionality.

According to an embodiment, the display device may further comprise a light-polarizing member 330 abutting at least a portion of the optical adhesive member 320. The window member 310, the optical adhesive member 320, the light-polarizing member 330, the second substrate 340, and the first substrate 350 may be stacked in order.

According to an embodiment, the specified area L1 may include at least a portion of an edge of the first substrate 350. The filler flow restricting structure 370 may be configured not to contact at least one of the optical adhesive member 320, the light-polarizing member 330, and the second substrate 340.

According to an embodiment, the filler flow restricting structure 370 may have at least a side surface inclined with respect to at least one of the optical adhesive member 320, the light-polarizing member 330, or the second substrate 340.

According to an embodiment, the display device may further comprise at least one electronic component 353 and a first circuit board 352 disposed on the space S between the window member 310 and the first substrate 350 and electrically connected with the first substrate 350.

According to an embodiment, the display device may further comprise a second circuit board 342 disposed on the space S between the window member 310 and the first substrate 350 and electrically connected with the second substrate 340.

According to an embodiment, an electronic device (e.g., 100 of FIG. 1) comprises a housing (e.g., 110 of FIG. 1), a window member (e.g., a window) 310 mounted on a front surface (e.g., 110A of FIG. 1) of the housing (e.g., 110 of FIG. 1), a first substrate 350 spaced apart from the window member 310, an optical adhesive member (e.g., an optical adhesive) 320 configured to attach the window member 310 with the first substrate 350, a light-polarizing member (e.g., a light-polarizer) 330 configured to transmit a designated wavelength of light, a second substrate 340 stacked on at least a portion of the first substrate 350, a filler flow restricting structure 370 disposed in a space between the window member 310 and the first substrate 350 and disposed in a corner of both end edges of the first substrate 350 when viewed from above an upper surface of the first substrate 350, and a filler (e.g., a seal or filler) 380 at least partially contacting the filler flow restricting structure 370 and configured to seal the space, wherein the optical adhesive member 320, the light-polarizing member 330, and the second substrate 340 form a stack structure, and wherein the stack structure is disposed between the window member 310 and the first substrate 350 to define the space between the window member 310 and the first substrate 350.

According to an embodiment, the filler flow restricting structure 370 may comprise at least one of a hydrophilic material or a hydrophobic material, and the filler 380 may comprise a material having a polarity different from a polarity of the filler flow restricting structure 370.

According to an embodiment, the filler flow restricting structure 370 may be configured to not contact at least one of the optical adhesive member 320, the light-polarizing member 330, and the second substrate 340.

According to an embodiment, a method of manufacturing a display device (e.g., 300 of FIG. 3) comprises seating a display panel (e.g., the first substrate 350 and/or the second substrate 340 of FIG. 3) (S1510), applying an optical adhesive (e.g., 320 of FIG. 3) to the display panel (S1520), attaching a window (e.g., 310 of FIG. 3) to the display panel (S1530) having the optical adhesive applied thereto, curing the optical adhesive (S1540), forming a filler flow restricting structure (e.g., 370 of FIG. 3) in a space (e.g., S1 of FIG. 5) between the display panel and the window member (S1550), curing the filler flow restricting structure (S1560), filling the space between the display panel and the window member with a seal or filler (e.g., 380 of FIG. 3) (S1570), and curing the seal or filler (S1580).

According to an embodiment, the method may further comprise discharging air from the space by filling, with the filler, the space between the display panel and the window member surrounded by a housing (e.g., 110 of FIG. 1) or a dummy member (not shown).

As is apparent from the foregoing description, according to various example embodiments of the disclosure, the filler flow restricting structure to prevent and/or reduce a filler from flowing down during the course of filling the internal space of the display device may be disposed in an area (e.g., a top corner of the first substrate) including at least a portion of the edge of the first substrate.

According to various example embodiments of the disclosure, during the course of filling with the filler (e.g., a second filler (resin)), the viscosity effect between the filler and the filler flow restricting structure (e.g., a first filler) may be exploited. Thus, after the internal space of the display device is fully filled, the filler may be prevented and/or reduced from flowing down the side surface of the display device.

According to various example embodiments of the disclosure, the filler flow restricting structure to prevent and/or reduce a filler from flowing down during the course of filling the internal space of the display device is disposed in an area (e.g., a top corner of the first substrate) including at least a portion of the edge of the first substrate. Thus, during the process of filling with the filler (e.g., the second filler (resin)), the air present inside the display device may be smoothly discharged through the path between the filler flow restricting structure and the stack structure (e.g., the optical adhesive member and polarizing member).

According to various example embodiments of the disclosure, the internal space of the display device may be completely filled. Thus, there may be provided a display device having enhanced water-proof and dust-proof capabilities while securing sufficient durability and strength and an electronic device including the display device.

While the disclosure has been illustrated and described with reference to various example embodiments thereof, it will be apparent to those of ordinary skill in the art that various changes in form and detail may be made thereto without departing from the spirit and scope of the disclosure as defined, for example, by the following claims and their equivalents.

What is claimed is:

1. A display device, comprising:
a window;
a first substrate spaced apart from the window and defining a space;
an optical adhesive disposed between the window and the first substrate, the optical adhesive configured to attach the window with the first substrate;
a filler flow restricting structure disposed in the space between the window and the first substrate and disposed in a specified area of the first substrate; and
a filler at least partially contacting the filler flow restricting structure and configured to seal the space between the window and the first substrate,
wherein the filler flow restricting structure includes at least one of a hydrophilic material or a hydrophobic material, and the filler comprises a hydrophobic material when the filler flow restricting structure comprises the hydrophilic material or a hydrophilic material when the filler flow restricting structure comprises the hydrophobic material, and
wherein the filler flow restricting structure is disposed in a corner of both end edges of the first substrate when viewed from above an upper surface of the first substrate.

2. The display device of claim 1, wherein the specified area includes at least a portion of an edge of the first substrate.

3. The display device of claim 1, wherein the filler flow restricting structure comprises at least one of a light-cured material, a thermosetting material, a moisture-cured material, a semi-solid material, or an elastic resin.

4. The display device of claim 1, wherein the filler comprises at least one of a light-cured material, a thermosetting material, a moisture-cured material, or a semi-solid material.

5. The display device of claim 1, wherein the optical adhesive has a polarity that is the same polarity as the filler.

6. The display device of claim 1, wherein the filler has a viscosity lower than a viscosity of the filler flow restricting structure.

7. The display device of claim 1, further comprising a second substrate stacked on at least a portion of the first substrate.

8. The display device of claim 7, further comprising a light-polarizer abutting at least a portion of the optical adhesive, wherein the window, the optical adhesive, the light-polarizer, the second substrate, and the first substrate are stacked in order.

9. The display device of claim 7, wherein the filler flow restricting structure has at least a side surface that is inclined with respect to at least one of the optical adhesive or the second substrate.

10. The display device of claim 7, further comprising at least one electronic component and a first circuit board disposed on the space and electrically connected with the first substrate.

11. The display device of claim 7, further comprising a second circuit board disposed on the space and electrically connected with the second substrate.

12. The display device of claim 8, wherein the specified area includes at least a portion of an edge of the first substrate, and wherein the filler flow restricting structure is configured to not contact at least one of the optical adhesive, the light-polarizer, and the second substrate.

13. An electronic device including a display, the electronic device comprising:
a housing;
a window mounted on a front surface of the housing;
a first substrate spaced apart from the window;
an optical adhesive configured to attach the window to the first substrate;
a light-polarizer configured to transmit a designated wavelength of light;
a second substrate stacked on at least a portion of the first substrate;
a filler flow restricting structure disposed in a space between the window and the first substrate and disposed in a corner of both end edges of the first substrate when viewed from above an upper surface of the first substrate; and
a filler at least partially contacting the filler flow restricting structure and configured to seal the space, wherein the optical adhesive, the light-polarizer, and the second substrate have a stack structure, and wherein the stack structure is disposed between the window and the first substrate to define the space between the window and the first substrate,
wherein the filler flow restricting structure includes at least one of a hydrophilic material or a hydrophobic material, and the filler comprises a hydrophobic material when the filler flow restricting structure comprises the hydrophilic material or a hydrophilic material when the filler flow restricting structure comprises the hydrophobic material.

14. The electronic device of claim 13, wherein the filler flow restricting structure is disposed in a specified area that includes at least a portion of an edge of the first substrate, and wherein the filler flow restricting structure is configured to not contact at least one of the optical adhesive, the light-polarizer, and the second substrate.

* * * * *